(12) United States Patent
Yost et al.

(10) Patent No.: US 9,477,740 B1
(45) Date of Patent: *Oct. 25, 2016

(54) SYSTEM AND METHOD FOR MANAGEMENT OF AN AUTOMATIC OLAP REPORT BROADCAST SYSTEM

(71) Applicant: MicroStrategy Incorporated, Vienna, VA (US)

(72) Inventors: Kyle Yost, Arlington, VA (US);
Michael Saylor, Vienna, VA (US);
Peter Wilding, Denver, CO (US);
Robert Trenkamp, Annapolis, MD (US)

(73) Assignee: MICROSTRATEGY, INCORPORATED, Vienna, VA (US)

( * ) Notice: Subject to any disclaimer, the term of this patent is extended or adjusted under 35 U.S.C. 154(b) by 564 days.

This patent is subject to a terminal disclaimer.

(21) Appl. No.: 13/685,220

(22) Filed: Nov. 26, 2012

Related U.S. Application Data

(63) Continuation of application No. 12/029,004, filed on Feb. 11, 2008, now Pat. No. 8,321,411, which is a continuation of application No. 10/339,579, filed on Jan. 10, 2003, now Pat. No. 7,330,847, which is a (Continued)

(51) Int. Cl.
*G06F 17/30* (2006.01)
(52) U.S. Cl.
CPC .............................. *G06F 17/30592* (2013.01)
(58) Field of Classification Search
None
See application file for complete search history.

(56) References Cited

U.S. PATENT DOCUMENTS

| 4,156,868 A | 5/1979 | Levinson |
| 4,554,418 A | 11/1985 | Toy |

(Continued)

FOREIGN PATENT DOCUMENTS

| CA | 2153096 | 12/1996 |
| EP | 0878948 | 11/1998 |

(Continued)

OTHER PUBLICATIONS

"MicroStrategy: DSS Broadcaster—The Industry's First Information Broadcaster Server", M2 Presswire, Dow Jones Interactive pp. 1-4, dated Mar. 20, 1998.*

(Continued)

*Primary Examiner* — Bai D. Vu
(74) *Attorney, Agent, or Firm* — Pillsbury Winthrop Shaw Pittman LLP

(57) ABSTRACT

A system, method and processor medium that manages automatic generation of output from an on-line analytical processing (OLAP) system. Scheduled services are processed in an OLAP system and output from the OLAP system is then automatically forwarded to one or more subscriber output devices specified for that service. The system manages the operation of the service processing system to increase throughput, increase speed, and improve administrator control over the processing. The system enables administrator control over processing by enabling administrators to view all services and all subscribers of the system, by maintaining an address book containing entries for subscribers of the service, and by scheduling processing of services. The system governs the volume of services being processed, the number of subscribers to a particular service, and the number of output devices to which a service may be broadcast.

16 Claims, 4 Drawing Sheets

Related U.S. Application Data continuation of application No. 09/345,440, filed on Jul. 1, 1999, now Pat. No. 6,567,796.

(60) Provisional application No. 60/126,055, filed on Mar. 23, 1999.

(56) References Cited

U.S. PATENT DOCUMENTS

| | | |
|---|---|---|
| 4,667,065 A | 5/1987 | Baungerter |
| 4,757,525 A | 7/1988 | Matthews et al. |
| 4,775,936 A | 10/1988 | Jung |
| 4,785,408 A | 11/1988 | Britton et al. |
| 4,788,643 A | 11/1988 | Trippe et al. |
| 4,811,379 A | 3/1989 | Grandfield |
| 4,812,843 A | 3/1989 | Champion, III et al. |
| 4,837,798 A | 6/1989 | Cohen et al. |
| 4,868,866 A | 9/1989 | Williams, Jr. |
| 4,931,932 A | 6/1990 | Dalnekoff et al. |
| 4,941,168 A | 7/1990 | Kelly, Jr. |
| 4,942,616 A | 7/1990 | Linstroth et al. |
| 4,953,085 A | 8/1990 | Atkins |
| 4,972,504 A | 11/1990 | Daniel, Jr. et al. |
| 4,974,252 A | 11/1990 | Osborne |
| 4,989,141 A * | 1/1991 | Lyons et al. .............. 705/36 R |
| 5,021,953 A | 6/1991 | Webber et al. |
| 5,101,352 A | 3/1992 | Rembert |
| 5,128,861 A | 7/1992 | Kagami et al. |
| 5,131,020 A | 7/1992 | Liebesny et al. |
| 5,168,445 A | 12/1992 | Kawashima et al. |
| 5,187,735 A | 2/1993 | Herrero Garcia et al. |
| 5,189,608 A * | 2/1993 | Lyons et al. .............. 705/30 |
| 5,195,086 A | 3/1993 | Baumgartner et al. |
| 5,204,821 A | 4/1993 | Inui et al. |
| 5,214,689 A | 5/1993 | O'Sullivan |
| 5,235,680 A | 8/1993 | Bijnagte |
| 5,237,499 A | 8/1993 | Garback |
| 5,255,184 A | 10/1993 | Hornick et al. |
| 5,270,922 A * | 12/1993 | Higgins .............. 705/37 |
| 5,272,638 A | 12/1993 | Martin et al. |
| 5,283,731 A | 2/1994 | Lalonde et al. |
| 5,323,452 A | 6/1994 | Dickman et al. |
| 5,325,465 A | 6/1994 | Hung et al. |
| 5,331,546 A | 7/1994 | Webber et al. |
| 5,333,180 A | 7/1994 | Brown et al. |
| 5,347,632 A | 9/1994 | Filepp et al. |
| 5,367,454 A | 11/1994 | Kawamoto et al. |
| 5,371,787 A | 12/1994 | Hamilton |
| 5,404,400 A | 4/1995 | Hamilton |
| 5,406,626 A | 4/1995 | Ryan |
| 5,422,809 A | 6/1995 | Griffin et al. |
| 5,430,792 A | 7/1995 | Jesurum et al. |
| 5,444,768 A | 8/1995 | Lemaire et al. |
| 5,452,341 A | 9/1995 | Sattar |
| 5,457,904 A | 10/1995 | Colvin |
| 5,479,491 A | 12/1995 | Herrero Garcia et al. |
| 5,487,132 A | 1/1996 | Cheng |
| 5,493,606 A | 2/1996 | Osder et al. |
| 5,500,793 A | 3/1996 | Deming, Jr. et al. |
| 5,500,920 A | 3/1996 | Kupiec |
| 5,502,637 A | 3/1996 | Beaulieu et al. |
| 5,524,051 A | 6/1996 | Ryan |
| 5,539,808 A | 7/1996 | Inniss et al. |
| 5,548,636 A | 8/1996 | Bannister et al. |
| 5,555,403 A | 9/1996 | Cambot et al. |
| 5,559,927 A | 9/1996 | Clynes |
| 5,572,643 A | 11/1996 | Judson |
| 5,572,644 A | 11/1996 | Liaw et al. |
| 5,576,951 A | 11/1996 | Lockwood |
| 5,577,165 A | 11/1996 | Takebayashi et al. |
| 5,581,602 A | 12/1996 | Szlam et al. |
| 5,583,922 A | 12/1996 | Davis et al. |
| 5,590,181 A | 12/1996 | Hogan et al. |
| 5,594,789 A | 1/1997 | Seazholtz et al. |
| 5,594,791 A | 1/1997 | Szlam et al. |
| 5,604,528 A | 2/1997 | Edwards et al. |
| 5,610,910 A | 3/1997 | Focsaneanu et al. |
| 5,630,060 A | 5/1997 | Tang et al. |
| 5,636,325 A | 6/1997 | Farrett |
| 5,638,424 A | 6/1997 | Denio et al. |
| 5,638,425 A | 6/1997 | Meador, III et al. |
| 5,644,624 A | 7/1997 | Caldwell |
| 5,649,186 A | 7/1997 | Ferguson |
| 5,651,117 A | 7/1997 | Arbuckle |
| 5,652,789 A | 7/1997 | Miner et al. |
| 5,659,298 A * | 8/1997 | Brooks et al. .............. 340/7.3 |
| 5,661,781 A | 8/1997 | DeJager |
| 5,664,115 A | 9/1997 | Fraser |
| 5,684,992 A | 11/1997 | Abrams et al. |
| 5,689,650 A | 11/1997 | McClelland et al. |
| 5,692,181 A * | 11/1997 | Anand et al. .............. 707/714 |
| 5,694,459 A | 12/1997 | Backaus et al. |
| 5,701,400 A | 12/1997 | Amado |
| 5,701,451 A | 12/1997 | Rogers et al. |
| 5,701,466 A | 12/1997 | Yong et al. |
| 5,706,442 A | 1/1998 | Anderson et al. |
| 5,710,889 A | 1/1998 | Clark et al. |
| 5,712,668 A | 1/1998 | Osborne et al. |
| 5,712,901 A | 1/1998 | Meermans |
| 5,715,370 A | 2/1998 | Luther et al. |
| 5,717,923 A * | 2/1998 | Dedrick |
| 5,721,827 A | 2/1998 | Logan et al. |
| 5,724,410 A | 3/1998 | Parvulescu et al. |
| 5,724,420 A | 3/1998 | Torgrim |
| 5,724,520 A | 3/1998 | Goheen |
| 5,724,525 A | 3/1998 | Beyers, II et al. |
| 5,732,216 A | 3/1998 | Logan et al. |
| 5,732,398 A | 3/1998 | Tagawa |
| 5,737,393 A | 4/1998 | Wolf |
| 5,740,421 A | 4/1998 | Palmon |
| 5,740,429 A | 4/1998 | Wang et al. |
| 5,740,829 A | 4/1998 | Jacobs et al. |
| 5,742,775 A | 4/1998 | King |
| 5,748,959 A | 5/1998 | Reynolds |
| 5,751,790 A | 5/1998 | Makihata |
| 5,751,806 A | 5/1998 | Ryan |
| 5,754,858 A | 5/1998 | Broman et al. |
| 5,754,939 A | 5/1998 | Herz et al. |
| 5,757,644 A | 5/1998 | Jorgensen et al. |
| 5,758,088 A | 5/1998 | Bezaire et al. |
| 5,758,351 A | 5/1998 | Gibson et al. |
| 5,761,432 A | 6/1998 | Bergholm et al. |
| 5,761,662 A | 6/1998 | Dasan |
| 5,764,736 A | 6/1998 | Shachar et al. |
| 5,764,975 A | 6/1998 | Taniguchi et al. |
| 5,765,028 A * | 6/1998 | Gladden .............. 706/25 |
| 5,765,143 A | 6/1998 | Sheldon et al. |
| 5,771,172 A | 6/1998 | Yamamoto et al. |
| 5,771,276 A | 6/1998 | Wolf |
| 5,781,735 A * | 7/1998 | Southard .............. 709/224 |
| 5,781,886 A | 7/1998 | Tsujiuchi |
| 5,781,911 A | 7/1998 | Young et al. |
| 5,787,151 A | 7/1998 | Nakatsu et al. |
| 5,787,278 A | 7/1998 | Barton et al. |
| 5,787,411 A | 7/1998 | Groff et al. |
| H1743 H | 8/1998 | Graves et al. |
| 5,790,935 A | 8/1998 | Payton |
| 5,790,936 A | 8/1998 | Dinkins |
| 5,793,980 A | 8/1998 | Glaser et al. |
| 5,794,207 A | 8/1998 | Walker et al. |
| 5,794,246 A | 8/1998 | Sankaran et al. |
| 5,797,124 A | 8/1998 | Walsh et al. |
| 5,799,063 A | 8/1998 | Krane |
| 5,799,156 A | 8/1998 | Hogan et al. |
| 5,802,159 A | 9/1998 | Smolentzov et al. |
| 5,802,488 A | 9/1998 | Edatsune |
| 5,802,526 A | 9/1998 | Fawcett et al. |
| 5,806,050 A | 9/1998 | Shinn et al. |
| 5,806,057 A | 9/1998 | Gormley et al. |
| 5,809,113 A | 9/1998 | Lieuwen |
| 5,809,415 A | 9/1998 | Rossmann |
| 5,809,483 A | 9/1998 | Broka et al. |
| 5,812,987 A | 9/1998 | Luskin et al. |
| 5,819,220 A | 10/1998 | Sarukkai et al. |
| 5,819,293 A | 10/1998 | Comer et al. |

(56) References Cited

U.S. PATENT DOCUMENTS

| | | | |
|---|---|---|---|
| 5,822,405 A | 10/1998 | Astarabadi | |
| 5,825,856 A | 10/1998 | Porter et al. | |
| 5,826,269 A | 10/1998 | Hussey | |
| 5,828,731 A | 10/1998 | Szlam et al. | |
| 5,832,451 A | 11/1998 | Flake et al. | |
| 5,838,252 A | 11/1998 | Kikinis | |
| 5,838,768 A | 11/1998 | Sumar et al. | |
| 5,848,396 A | 12/1998 | Gerace | |
| 5,848,397 A * | 12/1998 | Marsh et al. | 705/14.61 |
| 5,850,433 A | 12/1998 | Rondeau | |
| 5,852,811 A | 12/1998 | Atkins | |
| 5,852,819 A * | 12/1998 | Beller | |
| 5,854,746 A | 12/1998 | Yamamoto et al. | |
| 5,857,181 A | 1/1999 | Augenbraun et al. | |
| 5,857,191 A | 1/1999 | Blackwell, Jr. et al. | |
| 5,860,064 A | 1/1999 | Henton | |
| 5,862,325 A | 1/1999 | Reed et al. | |
| 5,864,605 A | 1/1999 | Keshav | |
| 5,864,827 A | 1/1999 | Wilson | |
| 5,864,828 A | 1/1999 | Atkins | |
| 5,867,153 A | 2/1999 | Grandcolas et al. | |
| 5,870,454 A | 2/1999 | Dahlen | |
| 5,870,724 A | 2/1999 | Lawlor et al. | |
| 5,870,746 A | 2/1999 | Knutson et al. | |
| 5,872,921 A * | 2/1999 | Zahariev et al. | 709/203 |
| 5,872,926 A | 2/1999 | Levac et al. | |
| 5,873,032 A | 2/1999 | Cox et al. | |
| 5,873,057 A | 2/1999 | Eves et al. | |
| 5,878,403 A | 3/1999 | DeFrancesco et al. | |
| 5,880,726 A | 3/1999 | Takiguchi et al. | |
| 5,884,262 A | 3/1999 | Wise et al. | |
| 5,884,266 A | 3/1999 | Dvorak | |
| 5,884,285 A | 3/1999 | Atkins | |
| 5,884,312 A | 3/1999 | Dustan et al. | |
| 5,890,140 A | 3/1999 | Clark et al. | |
| 5,893,079 A | 4/1999 | Cwenar | |
| 5,893,262 A | 4/1999 | Harbach | |
| 5,893,905 A * | 4/1999 | Main et al. | 705/7.38 |
| 5,897,620 A | 4/1999 | Walker et al. | |
| 5,907,598 A | 5/1999 | Mandalia et al. | |
| 5,907,837 A | 5/1999 | Ferrel et al. | |
| 5,911,135 A | 6/1999 | Atkins | |
| 5,911,136 A | 6/1999 | Atkins | |
| 5,913,195 A | 6/1999 | Weeren et al. | |
| 5,913,202 A * | 6/1999 | Motoyama | 705/36 R |
| 5,914,878 A | 6/1999 | Yamamoto et al. | |
| 5,915,001 A | 6/1999 | Uppaluru | |
| 5,915,238 A | 6/1999 | Tjaden | |
| 5,918,213 A | 6/1999 | Bernard et al. | |
| 5,918,217 A | 6/1999 | Maggioncalda et al. | |
| 5,918,225 A * | 6/1999 | White et al. | |
| 5,918,232 A * | 6/1999 | Pouschine et al. | |
| 5,920,848 A | 7/1999 | Schutzer et al. | |
| 5,923,736 A | 7/1999 | Shachar | |
| 5,924,068 A | 7/1999 | Richard et al. | |
| 5,926,789 A | 7/1999 | Barbara et al. | |
| 5,931,900 A | 8/1999 | Notani et al. | |
| 5,931,908 A | 8/1999 | Gerba et al. | |
| 5,933,484 A | 8/1999 | Partridge, III | |
| 5,933,816 A | 8/1999 | Zeanah et al. | |
| 5,940,818 A * | 8/1999 | Malloy et al. | |
| 5,943,395 A | 8/1999 | Hansen | |
| 5,943,399 A | 8/1999 | Bannister et al. | |
| 5,943,410 A | 8/1999 | Shaffer et al. | |
| 5,943,677 A | 8/1999 | Hicks | |
| 5,945,989 A | 8/1999 | Freishtat et al. | |
| 5,946,485 A | 8/1999 | Weeren et al. | |
| 5,946,666 A * | 8/1999 | Nevo et al. | 705/36 R |
| 5,946,711 A | 8/1999 | Donnelly | |
| 5,948,040 A | 9/1999 | DeLorme et al. | |
| 5,950,165 A | 9/1999 | Shaffer et al. | |
| 5,953,392 A | 9/1999 | Rhie et al. | |
| 5,953,406 A | 9/1999 | LaRue et al. | |
| 5,956,693 A * | 9/1999 | Geerlings | 705/14.53 |
| 5,960,437 A | 9/1999 | Krawchuk et al. | |
| 5,963,625 A | 10/1999 | Kawecki et al. | |
| 5,963,641 A | 10/1999 | Crandall et al. | |
| 5,970,122 A | 10/1999 | LaPorta et al. | |
| 5,970,124 A | 10/1999 | Csaszar et al. | |
| 5,970,482 A | 10/1999 | Pham et al. | |
| 5,974,398 A | 10/1999 | Hanson et al. | |
| 5,974,406 A | 10/1999 | Bisdikian et al. | |
| 5,974,441 A * | 10/1999 | Rogers et al. | 709/200 |
| 5,978,232 A | 11/1999 | Jo | |
| 5,978,766 A * | 11/1999 | Luciw | 705/7.29 |
| 5,978,796 A | 11/1999 | Malloy et al. | |
| 5,983,184 A | 11/1999 | Noguchi | |
| 5,987,415 A | 11/1999 | Breese et al. | |
| 5,987,586 A | 11/1999 | Byers | |
| 5,990,885 A | 11/1999 | Gopinath | |
| 5,991,365 A | 11/1999 | Pizano et al. | |
| 5,995,596 A | 11/1999 | Shaffer et al. | |
| 5,995,945 A | 11/1999 | Notani et al. | |
| 5,996,006 A | 11/1999 | Speicher | |
| 5,999,526 A | 12/1999 | Garland et al. | |
| 6,002,394 A | 12/1999 | Schein et al. | |
| 6,003,009 A | 12/1999 | Nishimura | |
| 6,006,225 A | 12/1999 | Bowman et al. | |
| 6,009,383 A | 12/1999 | Mony | |
| 6,009,410 A | 12/1999 | LeMole et al. | |
| 6,011,579 A | 1/2000 | Newlin | |
| 6,011,844 A | 1/2000 | Uppaluru et al. | |
| 6,012,045 A | 1/2000 | Barzilai et al. | |
| 6,012,066 A * | 1/2000 | Discount et al. | |
| 6,012,083 A * | 1/2000 | Savitzky et al. | 709/202 |
| 6,014,427 A | 1/2000 | Hanson et al. | |
| 6,014,428 A | 1/2000 | Wolf | |
| 6,014,429 A | 1/2000 | LaPorta et al. | |
| 6,016,335 A | 1/2000 | Lacy et al. | |
| 6,016,336 A | 1/2000 | Hanson | |
| 6,016,478 A | 1/2000 | Zhang et al. | |
| 6,018,710 A | 1/2000 | Wynblatt et al. | |
| 6,018,715 A | 1/2000 | Lynch et al. | |
| 6,020,916 A | 2/2000 | Gerszberg et al. | |
| 6,021,181 A | 2/2000 | Miner et al. | |
| 6,021,397 A | 2/2000 | Jones et al. | |
| 6,023,714 A | 2/2000 | Hill et al. | |
| 6,026,087 A | 2/2000 | Mirashrafi et al. | |
| 6,026,157 A | 2/2000 | Gulik et al. | |
| 6,029,195 A | 2/2000 | Herz | |
| 6,031,836 A | 2/2000 | Haserodt | |
| 6,035,336 A | 3/2000 | Lu et al. | |
| 6,036,055 A * | 3/2000 | Mogadam | B67D 3/0006 222/1 |
| 6,038,561 A * | 3/2000 | Snyder et al. | |
| 6,038,601 A | 3/2000 | Lambert et al. | |
| 6,041,359 A | 3/2000 | Birdwell | |
| 6,044,134 A | 3/2000 | De La Huerga | |
| 6,047,264 A | 4/2000 | Fisher et al. | |
| 6,047,327 A | 4/2000 | Tso et al. | |
| 6,049,812 A | 4/2000 | Bertram et al. | |
| 6,055,505 A | 4/2000 | Elston | |
| 6,055,513 A | 4/2000 | Katz et al. | |
| 6,055,514 A | 4/2000 | Wren | |
| 6,058,166 A | 5/2000 | Osder et al. | |
| 6,061,433 A | 5/2000 | Polcyn et al. | |
| 6,064,980 A | 5/2000 | Jacobi et al. | |
| 6,067,348 A | 5/2000 | Hibbeler | |
| 6,067,535 A | 5/2000 | Hobson et al. | |
| 6,073,109 A | 6/2000 | Flores et al. | |
| 6,073,140 A | 6/2000 | Morgan et al. | |
| 6,078,924 A * | 6/2000 | Ainsbury et al. | |
| 6,078,994 A | 6/2000 | Carey | |
| 6,081,815 A | 6/2000 | Spitznagel et al. | |
| 6,094,651 A | 7/2000 | Agrawal et al. | |
| 6,094,655 A | 7/2000 | Rogers et al. | |
| 6,097,791 A | 8/2000 | Ladd et al. | |
| 6,101,241 A | 8/2000 | Boyce et al. | |
| 6,101,443 A | 8/2000 | Kato et al. | |
| 6,101,473 A | 8/2000 | Scott et al. | |
| 6,104,798 A * | 8/2000 | Lickiss et al. | 379/201.12 |
| 6,108,686 A | 8/2000 | Williams, Jr. | |
| 6,115,686 A | 9/2000 | Chung et al. | |
| 6,115,693 A | 9/2000 | McDonough et al. | |

(56) References Cited

U.S. PATENT DOCUMENTS

| | | | |
|---|---|---|---|
| 6,119,095 | A | 9/2000 | Morita |
| 6,122,628 | A | 9/2000 | Castelli et al. |
| 6,122,636 | A | 9/2000 | Malloy et al. |
| 6,125,376 | A | 9/2000 | Klarlund et al. |
| 6,128,624 | A | 10/2000 | Papierniak et al. |
| 6,131,184 | A | 10/2000 | Weeren et al. |
| 6,134,548 | A | 10/2000 | Gottsman et al. |
| 6,134,563 | A | 10/2000 | Clancey et al. |
| 6,144,848 | A | 11/2000 | Walsh et al. |
| 6,144,938 | A | 11/2000 | Surace et al. |
| 6,151,572 | A | 11/2000 | Cheng et al. |
| 6,151,582 | A | 11/2000 | Huang et al. |
| 6,151,601 | A * | 11/2000 | Papierniak et al. |
| 6,154,527 | A | 11/2000 | Porter et al. |
| 6,154,766 | A * | 11/2000 | Yost et al. ............... 709/201 |
| 6,157,705 | A | 12/2000 | Perrone |
| 6,163,774 | A | 12/2000 | Lore et al. |
| 6,167,379 | A | 12/2000 | Dean et al. |
| 6,167,383 | A | 12/2000 | Henson |
| 6,169,894 | B1 | 1/2001 | McCormick et al. |
| 6,173,266 | B1 | 1/2001 | Marx et al. |
| 6,173,310 | B1 * | 1/2001 | Yost et al. ............... 709/201 |
| 6,173,316 | B1 | 1/2001 | De Boor et al. |
| 6,178,446 | B1 | 1/2001 | Gerszberg et al. |
| 6,181,935 | B1 | 1/2001 | Gossman et al. |
| 6,182,052 | B1 | 1/2001 | Fulton et al. |
| 6,182,053 | B1 | 1/2001 | Rauber et al. |
| 6,182,153 | B1 | 1/2001 | Hollberg et al. |
| 6,185,558 | B1 | 2/2001 | Bowman et al. |
| 6,189,008 | B1 | 2/2001 | Easty et al. |
| 6,192,050 | B1 | 2/2001 | Stovall |
| 6,195,689 | B1 | 2/2001 | Bahlmann |
| 6,199,082 | B1 | 3/2001 | Ferrel et al. |
| 6,201,948 | B1 | 3/2001 | Cook et al. |
| 6,203,192 | B1 | 3/2001 | Fortman |
| 6,209,026 | B1 | 3/2001 | Ran et al. |
| 6,215,858 | B1 | 4/2001 | Bartholomew et al. |
| 6,219,643 | B1 | 4/2001 | Cohen et al. |
| 6,219,654 | B1 | 4/2001 | Ruffin |
| 6,223,983 | B1 | 5/2001 | Kjonaas et al. |
| 6,226,360 | B1 | 5/2001 | Goldberg et al. |
| 6,226,656 | B1 | 5/2001 | Zawadzki et al. |
| 6,233,609 | B1 | 5/2001 | Mittal |
| 6,236,977 | B1 | 5/2001 | Verba et al. |
| 6,240,391 | B1 | 5/2001 | Ball et al. |
| 6,243,092 | B1 | 6/2001 | Okita et al. |
| 6,243,445 | B1 | 6/2001 | Begeja et al. |
| 6,246,672 | B1 | 6/2001 | Lumelsky |
| 6,246,981 | B1 | 6/2001 | Papineni et al. |
| 6,253,062 | B1 | 6/2001 | Leyendecker |
| 6,253,146 | B1 | 6/2001 | Hanson et al. |
| 6,256,659 | B1 | 7/2001 | McLain, Jr. et al. |
| 6,256,676 | B1 | 7/2001 | Taylor et al. |
| 6,259,443 | B1 | 7/2001 | Williams, Jr. |
| 6,260,050 | B1 | 7/2001 | Yost et al. |
| 6,263,051 | B1 | 7/2001 | Saylor et al. |
| 6,266,681 | B1 | 7/2001 | Guthrie |
| 6,269,151 | B1 | 7/2001 | Hanson |
| 6,269,336 | B1 | 7/2001 | Ladd et al. |
| 6,269,393 | B1 | 7/2001 | Yost et al. |
| 6,275,746 | B1 | 8/2001 | Leatherman et al. |
| 6,279,000 | B1 | 8/2001 | Suda et al. |
| 6,279,033 | B1 | 8/2001 | Selvarajan et al. |
| 6,279,038 | B1 | 8/2001 | Hogan et al. |
| 6,286,030 | B1 | 9/2001 | Wenig et al. |
| 6,289,352 | B1 | 9/2001 | Proctor |
| 6,292,811 | B1 | 9/2001 | Clancey et al. |
| 6,295,533 | B2 | 9/2001 | Cohen |
| 6,301,590 | B1 | 10/2001 | Siow et al. |
| 6,304,850 | B1 | 10/2001 | Keller et al. |
| 6,311,178 | B1 | 10/2001 | Bi et al. |
| 6,313,734 | B1 | 11/2001 | Weiss et al. |
| 6,314,094 | B1 | 11/2001 | Boys |
| 6,314,402 | B1 | 11/2001 | Monaco et al. |
| 6,314,533 | B1 | 11/2001 | Novik et al. |
| 6,317,750 | B1 | 11/2001 | Tortolani et al. |
| 6,321,190 | B1 | 11/2001 | Bernardes et al. |
| 6,321,198 | B1 | 11/2001 | Hank et al. |
| 6,321,221 | B1 | 11/2001 | Bieganski |
| 6,324,262 | B1 | 11/2001 | Tuttle |
| 6,327,343 | B1 | 12/2001 | Epstein et al. |
| 6,334,103 | B1 | 12/2001 | Surace et al. |
| 6,334,133 | B1 | 12/2001 | Thompson et al. |
| 6,336,124 | B1 | 1/2002 | Alam et al. |
| 6,341,271 | B1 | 1/2002 | Salvo et al. |
| 6,341,286 | B1 * | 1/2002 | Kawano |
| 6,349,290 | B1 | 2/2002 | Horowitz et al. |
| 6,360,139 | B1 | 3/2002 | Jacobs |
| 6,363,353 | B1 | 3/2002 | Chen |
| 6,363,393 | B1 | 3/2002 | Ribitzky |
| 6,366,298 | B1 | 4/2002 | Haitsuka et al. |
| 6,370,542 | B1 | 4/2002 | Kenyon |
| 6,380,954 | B1 | 4/2002 | Gunther |
| 6,385,191 | B1 | 5/2002 | Coffman et al. |
| 6,385,301 | B1 | 5/2002 | Nolting et al. |
| 6,385,583 | B1 | 5/2002 | Ladd et al. |
| 6,389,398 | B1 | 5/2002 | Lustgarten et al. |
| 6,393,406 | B1 | 5/2002 | Eder |
| 6,397,387 | B1 | 5/2002 | Rosin et al. |
| 6,400,804 | B1 | 6/2002 | Bilder |
| 6,400,938 | B1 | 6/2002 | Biedermann |
| 6,404,858 | B1 | 6/2002 | Farris et al. |
| 6,404,877 | B1 | 6/2002 | Bolduc et al. |
| 6,405,171 | B1 | 6/2002 | Kelley |
| 6,405,211 | B1 | 6/2002 | Sokol et al. |
| 6,411,685 | B1 | 6/2002 | O'Neal |
| 6,411,961 | B1 | 6/2002 | Chen |
| 6,412,012 | B1 | 6/2002 | Bieganski et al. |
| 6,415,269 | B1 | 7/2002 | Dinwoodie |
| 6,418,450 | B2 | 7/2002 | Daudenarde |
| 6,421,571 | B1 | 7/2002 | Spriggs et al. |
| 6,426,942 | B1 | 7/2002 | Sienel et al. |
| 6,430,545 | B1 | 8/2002 | Honarvar et al. |
| 6,434,524 | B1 | 8/2002 | Weber |
| 6,438,217 | B1 | 8/2002 | Huna |
| 6,442,560 | B1 | 8/2002 | Berger et al. |
| 6,442,598 | B1 | 8/2002 | Wright et al. |
| 6,445,694 | B1 | 9/2002 | Swartz |
| 6,449,634 | B1 | 9/2002 | Capiel |
| 6,456,699 | B1 | 9/2002 | Burg et al. |
| 6,456,974 | B1 | 9/2002 | Baker et al. |
| 6,457,018 | B1 | 9/2002 | Rubin |
| 6,459,427 | B1 | 10/2002 | Mao et al. |
| 6,459,774 | B1 | 10/2002 | Ball et al. |
| 6,466,654 | B1 | 10/2002 | Cooper et al. |
| 6,470,335 | B1 | 10/2002 | Marusak |
| 6,473,612 | B1 | 10/2002 | Cox et al. |
| 6,477,549 | B1 | 11/2002 | Hishida et al. |
| 6,480,842 | B1 | 11/2002 | Agassi et al. |
| 6,482,156 | B2 | 11/2002 | Iliff |
| 6,487,277 | B2 | 11/2002 | Beyda et al. |
| 6,487,533 | B2 | 11/2002 | Hyde-Thomson et al. |
| 6,490,564 | B1 | 12/2002 | Dodrill et al. |
| 6,490,593 | B2 | 12/2002 | Proctor |
| 6,493,447 | B1 | 12/2002 | Goss et al. |
| 6,493,685 | B1 | 12/2002 | Ensel et al. |
| 6,496,568 | B1 | 12/2002 | Nelson |
| 6,501,832 | B1 | 12/2002 | Saylor et al. |
| 6,507,817 | B1 | 1/2003 | Wolfe et al. |
| 6,513,019 | B2 | 1/2003 | Lewis |
| 6,515,968 | B1 * | 2/2003 | Combar et al. ............... 370/252 |
| 6,519,562 | B1 | 2/2003 | Phillips et al. |
| 6,522,727 | B1 * | 2/2003 | Jones ............... 379/88.23 |
| 6,526,399 | B1 | 2/2003 | Coulson et al. |
| 6,526,575 | B1 | 2/2003 | McCoy et al. |
| 6,535,866 | B1 | 3/2003 | Iwadate |
| 6,539,359 | B1 | 3/2003 | Ladd et al. |
| 6,549,612 | B2 | 4/2003 | Gifford et al. |
| 6,567,796 | B1 | 5/2003 | Yost et al. |
| 6,567,814 | B1 | 5/2003 | Bankier et al. |
| 6,571,281 | B1 | 5/2003 | Nickerson |
| 6,574,605 | B1 | 6/2003 | Sanders et al. |
| 6,578,000 | B1 | 6/2003 | Dodrill et al. |
| 6,587,547 | B1 | 7/2003 | Zirngibl et al. |

(56) References Cited

U.S. PATENT DOCUMENTS

| | | | |
|---|---|---|---|
| 6,587,822 B2 | 7/2003 | Brown et al. | |
| 6,591,263 B1 | 7/2003 | Becker et al. | |
| 6,594,672 B1 | 7/2003 | Lampson et al. | |
| 6,594,682 B2 | 7/2003 | Peterson et al. | |
| 6,600,736 B1 | 7/2003 | Ball et al. | |
| 6,604,135 B1 | 8/2003 | Rogers et al. | |
| 6,606,596 B1 | 8/2003 | Zirngibl et al. | |
| 6,611,834 B1 | 8/2003 | Aggarwal et al. | |
| 6,643,639 B2 | 11/2003 | Biebesheimer et al. | |
| 6,658,093 B1 | 12/2003 | Langseth et al. | |
| 6,658,432 B1 | 12/2003 | Alavi et al. | |
| 6,664,897 B2 | 12/2003 | Pape et al. | |
| 6,671,716 B1 | 12/2003 | Diedrichsen et al. | |
| 6,678,674 B1 | 1/2004 | Saeki | |
| 6,694,326 B2 | 2/2004 | Mayhew et al. | |
| 6,697,103 B1* | 2/2004 | Fernandez et al. | 348/143 |
| 6,697,824 B1 | 2/2004 | Bowman-Amuah | |
| 6,697,964 B1 | 2/2004 | Dodrill et al. | |
| 6,701,311 B2 | 3/2004 | Biebesheimer et al. | |
| 6,707,889 B1 | 3/2004 | Saylor et al. | |
| 6,741,967 B1 | 5/2004 | Wu et al. | |
| 6,741,995 B1 | 5/2004 | Chen et al. | |
| 6,748,066 B1 | 6/2004 | Espejo et al. | |
| 6,751,657 B1 | 6/2004 | Zothner | |
| 6,754,233 B1 | 6/2004 | Henderson et al. | |
| 6,757,362 B1 | 6/2004 | Cooper et al. | |
| 6,760,412 B1 | 7/2004 | Loucks | |
| 6,760,720 B1 | 7/2004 | De Bellis | |
| 6,763,300 B2 | 7/2004 | Jones | |
| 6,765,997 B1 | 7/2004 | Zirngibl et al. | |
| 6,768,788 B1 | 7/2004 | Langseth et al. | |
| 6,782,378 B2 | 8/2004 | Leathers | |
| 6,785,592 B1 | 8/2004 | Smith et al. | |
| 6,785,668 B1 | 8/2004 | Polo et al. | |
| 6,785,676 B2 | 8/2004 | Oblinger | |
| 6,785,710 B2 | 8/2004 | Kikinis | |
| 6,788,768 B1 | 9/2004 | Saylor et al. | |
| 6,792,086 B1 | 9/2004 | Saylor et al. | |
| 6,798,867 B1 | 9/2004 | Zirngibl et al. | |
| 6,826,593 B1 | 11/2004 | Acharya et al. | |
| 6,829,334 B1 | 12/2004 | Zirngibl et al. | |
| 6,831,668 B2 | 12/2004 | Cras et al. | |
| 6,836,537 B1 | 12/2004 | Zirngibl et al. | |
| 6,850,603 B1 | 2/2005 | Eberle et al. | |
| 6,873,693 B1 | 3/2005 | Langseth et al. | |
| 6,885,734 B1 | 4/2005 | Eberle et al. | |
| 6,885,736 B2 | 4/2005 | Uppaluru | |
| 6,888,929 B1 | 5/2005 | Saylor et al. | |
| 6,895,084 B1 | 5/2005 | Saylor et al. | |
| 6,915,308 B1 | 7/2005 | Evans et al. | |
| 6,934,687 B1 | 8/2005 | Papierniak et al. | |
| 6,940,953 B1 | 9/2005 | Eberle et al. | |
| 6,964,012 B1 | 11/2005 | Zirngibl et al. | |
| 6,975,835 B1 | 12/2005 | Lake et al. | |
| 6,977,992 B2 | 12/2005 | Zirngibl et al. | |
| 6,993,476 B1 | 1/2006 | Dutta et al. | |
| 7,007,029 B1 | 2/2006 | Chen | |
| 7,020,251 B2 | 3/2006 | Zirngibl et al. | |
| 7,031,952 B1 | 4/2006 | Heumann et al. | |
| 7,065,188 B1 | 6/2006 | Mei et al. | |
| 7,080,328 B1 | 7/2006 | Sawyer | |
| 7,082,422 B1 | 7/2006 | Zirngibl et al. | |
| 7,103,605 B1 | 9/2006 | Hazi et al. | |
| 7,106,843 B1 | 9/2006 | Gainsboro et al. | |
| 7,110,952 B2 | 9/2006 | Kursh | |
| 7,111,010 B2 | 9/2006 | Chen | |
| 7,117,172 B1 | 10/2006 | Black | |
| 7,120,628 B1 | 10/2006 | Conmy et al. | |
| 7,130,800 B1 | 10/2006 | Currey et al. | |
| 7,143,109 B2 | 11/2006 | Nagral et al. | |
| 7,165,098 B1 | 1/2007 | Boyer et al. | |
| 7,197,461 B1 | 3/2007 | Eberle et al. | |
| 7,225,249 B1* | 5/2007 | Barry et al. | 709/227 |
| 7,266,181 B1 | 9/2007 | Zirngibl et al. | |
| 7,272,212 B2 | 9/2007 | Eberle et al. | |
| 7,330,847 B2 | 2/2008 | Saylor et al. | |
| 7,340,040 B1 | 3/2008 | Saylor et al. | |
| 7,379,540 B1 | 5/2008 | Van Gundy | |
| 7,389,355 B2 | 6/2008 | Brown et al. | |
| 7,401,046 B2 | 7/2008 | Hollderman et al. | |
| 7,428,302 B2 | 9/2008 | Zirngibl et al. | |
| 7,440,898 B1 | 10/2008 | Eberle et al. | |
| 7,486,780 B2 | 2/2009 | Zirngibl et al. | |
| 7,519,544 B1 | 4/2009 | Bauer | |
| 7,552,054 B1 | 6/2009 | Stifelman et al. | |
| 7,571,226 B1 | 8/2009 | Partovi et al. | |
| 7,676,368 B2 | 3/2010 | Shizuka et al. | |
| 7,716,055 B1 | 5/2010 | McIntosh et al. | |
| 7,818,212 B1 | 10/2010 | Mesaros | |
| 7,881,443 B2 | 2/2011 | Langseth et al. | |
| 7,949,728 B2 | 5/2011 | Rivette et al. | |
| 7,962,326 B2 | 6/2011 | Tsourikov et al. | |
| 7,966,328 B2 | 6/2011 | Germeraad et al. | |
| 8,051,369 B2 | 11/2011 | Zirngibl et al. | |
| 8,065,338 B2 | 11/2011 | Harvey | |
| 8,094,788 B1 | 1/2012 | Eberle et al. | |
| 8,130,918 B1 | 3/2012 | Zirngibl et al. | |
| 8,321,411 B2 | 11/2012 | Yost et al. | |
| 8,607,138 B2 | 12/2013 | Liebl et al. | |
| 8,995,628 B2 | 3/2015 | Zirngibl et al. | |
| 2001/0012335 A1 | 8/2001 | Kaufman et al. | |
| 2001/0013004 A1 | 8/2001 | Haris et al. | |
| 2001/0020242 A1 | 9/2001 | Gupta et al. | |
| 2002/0006126 A1 | 1/2002 | Johnson et al. | |
| 2002/0026496 A1 | 2/2002 | Boyer et al. | |
| 2002/0035501 A1 | 3/2002 | Handel et al. | |
| 2002/0059373 A1 | 5/2002 | Boys | |
| 2002/0065752 A1 | 5/2002 | Lewis | |
| 2002/0065879 A1 | 5/2002 | Ambrose et al. | |
| 2002/0067808 A1 | 6/2002 | Agraharam et al. | |
| 2003/0009430 A1 | 1/2003 | Burkey et al. | |
| 2003/0088872 A1 | 5/2003 | Maissel et al. | |
| 2003/0101201 A1 | 5/2003 | Saylor et al. | |
| 2004/0128514 A1 | 7/2004 | Rhoads | |
| 2004/0133907 A1 | 7/2004 | Rodriguez et al. | |
| 2004/0153438 A1 | 8/2004 | Rossiter et al. | |
| 2004/0205045 A1 | 10/2004 | Chen et al. | |
| 2006/0085742 A1 | 4/2006 | Harold et al. | |
| 2006/0129499 A1 | 6/2006 | Combar et al. | |
| 2006/0282408 A1 | 12/2006 | Wisely et al. | |
| 2007/0203915 A1* | 8/2007 | McCully | G06F 17/30474 |
| 2012/0166185 A1 | 6/2012 | Zirngibl et al. | |

FOREIGN PATENT DOCUMENTS

| | | |
|---|---|---|
| EP | 0889627 | 1/1999 |
| WO | WO 94/15294 | 7/1994 |
| WO | WO 98/58356 | 12/1998 |

OTHER PUBLICATIONS

MSTR003—Relational OLAP Server, MicroStrategy; DSS Server Brochure, 1996.

MSTR004—Relational OLAP Interface for the Web, 1996.

MSTR005—"Andyne Introduces Greater Flexibility for Database Queries; New Query Management Option Provides Enhanced Management for Enterprise-Wide Queries," *Business Wire*, Jan. 3, 1996. Available from the Dow Jones Interactive Web Site http://Ptg.djnr.com.

MSTR006—Catalano, Carla, "OLAP, Scheduling, Tuning for DBMSs," *Computer World*, Apr. 1, 1996. Available in Dow Jones Interactive, http://www.dowjonesinteractive.com.

MSTR007—Andyne's Intranet Strategy Brings DSS to the Web; Company Aims to Dramatically Broaden Scope of Reporting, Online Analysis, *PR Newswire*, Sep. 18, 1996. Available from the Dow Jones Interactive Web Site http://Ptg.djnr.com.

MSTR008—Sachs et al., "A First Step on the Path to Automated Flight Reservations," *Interactive Voice Technology for Telecommunications*, 1996.

MSTR009—Bennacef et al., "Dialog in the RAILTEL Telephone-Based System," *Spoken Language*, 1996.

(56) References Cited

OTHER PUBLICATIONS

MSTR010—Brooks, Peter, "Targeting Customer," *DBMS*, v9, n13, Dec. 1996, pp. 54-58.

MSTR011—"Sterling Software Announces Alliance with Thinking Machines," *Business Wire*, Dec. 16, 1996. Available from the Dow Jones Interactive Web Site http://Ptg.djnr.com.

MSTR012—Gupta et al., "Index Selection for OLAP," *Proceedings of the 13th International Conference on Data Engineering*, © 1997.

MSTR013—Ho et al., "Partial-Sum Queries in OLAP Data Cubes Using Covering Codes," *PODS*'97 Tucson, AZ USA.

MSTR014—Kilmartin et al., "*Real Time Stock Price Distribution Utilising the GSM Short Messaging Service*," 1997 IEEE International Conference on Personal Wireless, 1997, Abstract.

MSTR015—*Data Warehousing: Data Access and Delivery, Infobase Technology Database*, 1997, http://www.dbaint.com/oldinfobase/dwaccdel.html.

MSTR016—Gardner, Dana Marie, "Cashing in With Data Warehouses and the Web," *Data Based Advisor*, v15, n2, Feb. 1997, pp. 60-63.

MSTR017—Intrepid Systems Announces General Availability of DecisionMaster 4.1; Retailing's Premier Decision Support Software Enhancements Automate Information Delivery, *Business Wire*, May 27, 1997. Available on Dow Jones Interactive, http://www.dowjonesinteractive.com.

MSTR018—*Blue Isle Software InTouch/2000 Product Overview*, Blue Isle Software, Inc. (archived Jul. 7, 1997), http://blueisle.com. Available in Internet Archive Waybackmachine http://www.archive.org.

MSTR019—"Blue Isle Software Teams with Arbor Software to Deliver Automated Systems Management Capabilities for Arbor Essbase," *Business Wire*, Oct. 29, 1997. Available in Lexis, Nexis Library, ALLNWS file.

MSTR020—"Early Warning: Compulogic's Dynamic Query Messenger," *Software Futures*, Nov. 1, 1997. Available in Lexis, Nexis Library, ALLNWS file.

MSTR021—Kilmartin et al., "Development of an Interactive Voice Response System for a GSM SMS Based Share Price Server," DSP '97 Conference Proceedings, Dec. 1997, Abstract.

MSTR022—Avnur et al., "*CONTROL: Continuous Output and Navigation Technology with Refinement On-Line*," © 1998.

MSTR023—Liang et al., "Computing Multidimensional Aggregates in Parallel," *1998 International Conference on Parallel and Distributed Systems, IEEE*.

MSTR024—Friel et al., *An Automated Stock Price Delivery System Based on the GSM Short Message Service*, ICC'98 1998 IEEE International Conference on Communications, 1998, Abstract.

MSTR025—Microstrategy Products and Services, 1998.

MSTR026—Personalized Information Broadcast Server, 1998.

MSTR027—"Information Advantage Wins Product of the Year Award for Knowledge Management," *Business Wire*, Mar. 4, 1998. Available in Lexis, Nexis Library, ALLNWS file.

MSTR028—Emigh, Jacqueline, "Information Builders, Inc. Launches WebFocus Suit," *Newbytes*, Mar. 10, 1998. Available in Northern Light, http://www.northernlight.com, Doc. ID BS19980311010000172.

MSTR029—*Microstrategy: DSS Broadcaster—The Industry's First Information Broadcast Server, M2 Presswire*, Mar. 20, 1998. Available in Dow Jones Interactive http://djinteractive.com.

MSTR030—*Microstrategy Introduces DSS Broadcaster—The Industry's First Information Broadcast Server*, Mar. 23, 1998. http://strategy.com/newsandevent/New/PressRelease/1998/broadcaster.htm.

MSTR031—*Microstrategy Introduces DSS Broadcaster—The Industry's First Information Broadcast Server*, Mar. 23, 1998. http://www.strategy.com/newsandevents/News/PressReleases/1998/broadcaster.htm.

MSTR032—"MSNBC on the Internet Launches New Traffic Section; MSNBC.com and Sidewalk.com Team with TrafficStation for Production of Comprehensive Site for Drivers," *Financial News*, Redmond, Wash., Apr. 15, 1998.

MSTR033—Prospectus—4,000,000 Shares Microstrategy Class a Common Stock, Jun. 11, 1998.

MSTR034—"System for Telephone Access to Internet Applications—Uses Dial Tones and/or Voice with Interactive Voice Response Unit to Pass Request to Processor that Converts Requests to Communication Protocol Command Set," IBM, Patent No. RD 98412088. Jul. 20, 1998, Abstract.

MSTR035—Relational OLAP Interface, Programmer's Reference and SDK Guide, Version 5.0, Aug. 1998.

MSTR036—Data Warehouse Dossier, Fall 1998.

MSTR037—"Microstrategy Announces Enhanced Versions of DSS Web and DSS Server," Oct. 26, 1998, http://www.strategy.com/NewsandEvents/news/pressreleases/1998/server5.5.htm.

MSTR038—System Guide DSS Web Version 5.5, Feb. 1999.

MSTR039—Developer Guide DSS Web Version 5.5, Feb. 1999.

MSTR040—Media Output Book, v2.0, Feb. 16, 1999.

MSTR041—Computer Telephony, from www.telecomlibrary.com,—Sep. 9, 1999.

MSTR042—Frequently Asked Questions About DSS Web, printed Feb. 23, 1999, http://www.strategy.com/products/Web/faq.htm.

MSTR043—"Traffic Station Extends Service to Six New Markets in North America, Reaching its Goal of 20 Markets by the New Millennium," *Business Editors/Multimedia & Transportation Writers*, Los Angeles, Dec. 23, 1999.

MSTR044—Traffic Station Corporate Information, http://www.trafficstation.com/home/corporate.html, Jan. 10, 2001.

MSTR045—Newswire, "Net Phones to Outsell Laptops by 2002", Dec. 2, 1998, Dialog File #03635692.

MSTR046—RCR Radio Communications Report, "Comverse Developing Unified Applications for GSM Smartphone Marketplace", Feb. 23, 1998, V. 17, No. 8, p. 106, Dialog File #02078693.

MSTR047—America's Network, "Wireless Web Browsing: How Long Will Deployment Take? (There Will be 22 Mil Devices Other than PCs Accessing the Internet by 2000)", Dec. 15, 1996, vol. 100, No. 24, p. 30+, Dialog File #01708089.

MSTR048—Adali et al., "Query Caching and Optimization in Distributed Mediator Systems", SIGMOD '96, Jun. 1996, Montreal, Canada, pp. 137-148.

MSTR049—Alur et al., "Directory-Driven Information Delivery", DataBase Associates Int'l, Jul. 1996, printed from http://web.archive.org on Jan. 7, 2002, 12 pages.

MSTR050—Chawathe et al., "Representing and Querying Changes in Semistructured Data", Proceedings of the 14th International Conference on Data Engineering, IEEE, Feb. 23-27, 1998, pp. 4-13.

MSTR051—Codd et al., "Providing OLAP (On-line Analytical Processing) to User-Analysts; an IT Mandate", San Jose, California, Codd and Date, 1993, 1 page.

MSTR052—Flohr, "Using Web-Based Applications to Perform On-Line Analytical Processing Builds on the Strengths of Both Technologies", *OLAP by Web*, Sep. 1997, 8 pages.

MSTR053—Gesmann et al., "A Remote Cooperation System Supporting Interoperability in Heterogeneous Environments", Proceedings of the Third International Workshop on Research Issued in Data Engineering, IEEE, Apr. 19-20, 1993, pp. 152-160.

MSTR054—Hackathorn, "Solutions to Overworked Networks and Unruly Software Distribution are Just Part of P&S.", *Publish or Perish*, Sep. 1997, 21 pages.

MSTR055—Liscano et al., "Integrating Multi-Modal Messages across Heterogeneous Networks", IEEE, 1997, pp. 45-53, Abstract.

MSTR056—Liu et al., "Differential Evaluation of Continual Queries", Proceedings of the 16th International Conference on Distributed Computing Systems, IEEE, May 27-30, 1996, pp. 458-465.

MSTR057—Newing, "Relational Databases are not Suitable for Management Information Systems: and That's Official!", Management Accounting, London, vol. 72, No. 8, Sep. 1994, 4 pages.

MSTR058—Raden, "Teraforming the Data Warehouse", Archer Decision Sciences, printed from http://www.archer-decision.com Jan. 16, 2002, 13 pages.

MSTR059—Schreier et al., Alert: An Architecture for Transforming a Passive DBMS into an Active DBMS, Proceedings of the 17th International Conference on Very Large Data Bases, Sep. 3-6, 1991, pp. 469-478.

(56) References Cited

OTHER PUBLICATIONS

MSTR060—Schultz, "Adept—The Advanced Database Environment for Planning and Tracking", *Bell Labs Technical Journal*, Jul.-Sep. 1998, pp. 3-9.
MSTR061—Spofford, "Attack of the Killer APIs", Intelligent Enterprise's Database Online Programming and Design, printed from http://www.dbpd.com on Dec. 21, 2001, 10 pages.
MSTR062—Stonebraker et al., "On Rules, Procedures, Caching and Views in Data Base Systems", Proceedings of the 1990 ACM SIGMOD International Conference on Management of Data, May 23-25, 1990, pp. 281-290.
MSTR063—Terry et al., "Continuous Queries over Append-Only Databases", Proceedings of the 1992 ACM SIGMOD International Conference on Management of Data, Jun. 2-5, 1992, pp. 321-330.
MSTR064—Search Results from Internet Archive Wayback Machine, searched for http://www.infoadvan.com, printed from http://web.archive.org on Dec. 19, 2001, 40 pages.
MSTR065—Search Results from Internet Archive Wayback Machine, searched for http://www.platinum.com, printed from http://web.archive.org on Dec. 21, 2001, 17 pages.
MSTR066—ROLAP Case Studies, 30 pages (no earlier than Sep. 1997).
MSTR067—"Fast and Flexible Access to Databases", *Byte*, Aug. 1997, pp. 53-54.
MSTR068—"Distributed Application Development with PowerBuilder 6.0", Manning Publications Co., printed from http://www.manning.com on Jan. 15, 2002, 12 pages.
MSTR069—"PowerBuilder 6.0 Questions & Answers", Manning Publications Co., printed from http://www.manning.com on Jan. 15, 2002, 13 pages.
MSTR070—"PowerBuilder 6.0 Questions & Answers", Manning Publications Co., printed from http://www.manning.com on Jan. 17, 2002, 2 pages.
MSTR071—Cheshire, "Product News—A Sea of Opportunity", Intelligent Enterprise's Database Online Programming and Design, printed from http://www.dbpd.com on Jan. 17, 2002, 6 pages.
MSTR072—"Information Advantage—Business Intelligence", "Live Information Repository . . . ", printed from http://www.infoadvan.com, on Dec. 19, 2001, 5 pages.
MSTR073—"Objective Data Inc.—Computer Software Consultants", Client List, printed from http://objectivedata.com/clients.htm on Jan. 15, 2002, 5 pages.
MSTR074—"Online Analytical Processing", printed from http://searchdatabase.techtarget.com on Jan. 18, 2002, 3 pages.
MSTR075—"Seagate Crystal Reports 8", printed from http://www.crystaluser.com on Dec. 28, 2001, 6 pages.
MSTR076—"Andyne Delivers Personal Olap with PaBLO 4.0", Press Release, Mar. 31, 1997, Andyne Computing Limited, 5 pages.
MSTR077—"Andyne Announces Support for Microsoft's OLE DB for OLAP", Press Release, Sep. 10, 1997, Andyne Computing Limited, 4 pages.
MSTR078—"Andyne QMO—Manage Data Access", Andyne Computing, printed from http://web.archive.org on Jan. 3, 2002, 5 pages.
MSTR079—"The Andyne Vision—On the Road to the Integrated Solution", Andyne Computing, printed from http://web.archive.org on Jan. 3, 2002, 11 pages.
MSTR080—"Visual Information Access for Multidimensional Companies . . .", Andyne Corporate Profile, 2 pages, © 1996.
MSTR081—"MicroStrategy Announces DSS Web 5.0; DSS Web Introduces the Web-Cast of Decision Support", MicroStrategy, Jan. 5, 1998, printed Dec. 10, 2001, 2 pages.
MSTR082—"MicroStrategy Introduces DSS Web Standard Edition; Web Interface Provides powerful, Easy-to-Use DSS Tool for Mainstream End-User Market", MicroStrategy, Apr. 27, 1998, printed Dec. 10, 2001, 2 pages.
MSTR083—"MicroStrategy Advantages: Proven Multi-Tier Architecture", printed from http://web.archive.org, 4 pages, © 1995.
MSTR084—"MicroStrategy 'Consumerizes' the Data Warehouse with Its New 4.0 Product Line", Press Release, Jun. 24, 1996, MicroStrategy, printed from http://web.archive.org on Dec. 8, 2001, 7 pages.
MSTR085—"MicroStrategy Announces DSS Server 3.0", Press Release, Aug. 8, 1995, MicroStrategy, printed from http://web.archive.org on Dec. 8, 2001, 5 pages.
MSTR086—"MicroStrategy Announces True Relational OLAP Product Line", Press Release, Aug. 8, 1995, MicroStrategy, printed from http://web.archive.org on Dec. 8, 2001, 5 pages.
MSTR087—"DSS Administrator Features Overview", MicroStrategy, No. 05090297, 2 pages, @ 1996, 1997.
MSTR088—"DSS Agent Features Overview", MicroStrategy, No. 05100896, 2 pages, © 1996.
MSTR089—"DSS Server Features Overview", MicroStrategy, No. 05140896, 2 pages, © 1996.
MSTR090—"Relational OLAP Interface", DSS Agent, MicroStrategy, 22 pages and 20 pages (no earlier than 1996).
MSTR091—"Relational OLAP Interface for the Web", MicroStrategy DSS Web Brochure, 4 pages, © 1995.
MSTR092—"Data Warehouse and DSS Management Tools", DSS Administrator, MicroStrategy, 16 pages, ©1996, 1997.
MSTR093—"OLE API for Custom Application Development", DSS Objects, MicroStrategy, 4 pages, © 1996.
MSTR094—"Arbor Software OLAP Products", Brochure, Arbor Software, 12 pages, ©1998.
MSTR095—"InfoTrac OneFile", *Database Programming & Design*, vol. 11, No. 7, Jul. 1998, 12 pages.
MSTR096—"Andyne GQL Version 3.3.2 Available Jul. 17$^{th}$; Featuring Multi-Pass Reporting, Time Governors and Scripting", *Business Wire*, Jun. 26, 1995, Andyne Computing Limited, 4 pages.
MSTR097—"MicroStrategy Announces DSS Server 3.0; Three-Tier Architecture Results in Exceptional Performance and Scalability for DSS Applications", *Business Wire*, Aug. 8, 1995, MicroStrategy, 3 pages.
MSTR098—"Information Advantage Ships DecisionSuite 3.0 Business Analysis Applications for Data Warehouses", *Business Wire*, Nov. 9, 1995, 3 pages.
MSTR099—"Information Advantage Announces WebOLAP; First Structured Content analysis Server for the World Wide Web", *Business Wire*, Feb. 5, 1996, 3 pages.
MSTR100—"Andyne Delivers Second Stage of the Andyne Integrated Solution", *Canada NewsWire*, May 13, 1996, 3 pages.
MSTR101—"Andyne Computing Ltd is Shipping Version 3.3.2 of Its GQL Decision Support System", *CommunicationsWeek*, No. 566, Jul. 17, 1995, p. 16.
MSTR102—"Andyne Computing Introduces New Query Management Option as Companion Product to Andyne's GQL Product", *CommunicationsWeek*, No. 592, Jan. 15, 1996, p. 16.
MSTR103—"Andyne Hopes to Benefit from Current Data Warehousing Hype with GQL Query Language", *Computergram International*, No. 2798, Nov. 22, 1995, 1 page.
MSTR104—"Andyne's GQL Makes It Easier—New Version of Reporting, Analysis Tool Unveiled", Computer Reseller News, No. 685, May 27, 1996, p. 79.
MSTR105—"The Right Tools", *Computer Weekly*, Aug. 29, 1996, 4 pages.
MSTR106—"4 OLAP Tools; The Common Thread is that OLAP Tools Drain Too Much Time and Energy Before You Get What You Need", *Computerworld*, Dec. 2, 1996, 4 pages.
MSTR107—"GQL", *Data Management Review* (*DM Review*), vol. 6, No. 5, May 1996, p. 47.
MSTR108—"DB2 Today Newsletter", Jun. 1999, 2 pages.
MSTR109—"GQL 3.2", DBMS, vol. 8, No. 1, Jan. 1995, 2 pages.
MSTR110—"Everything's Coming Up Warehouse", *DBMS*, Oct. 1, 1995, 3 pages.
MSTR111—"Query, Reporting, and Analysis Tools", *DBMS*, vol. 9, No. 6, Jun. 15, 1996, 14 pages.
MSTR112—Brooks, "MCI Leverages Data Warehouse Technology to Strengthen its Marketing Campaigns", *DBMS*, Dec. 1996, 7 pages.
MSTR113—Dobson, "Data Binding in Dynamic HTML", *DBMS*, Mar. 1998, 12 pages.

(56) References Cited

OTHER PUBLICATIONS

MSTR114—Dodd, "Native is as Native Does", *HP Professional*, vol. 12, No. 12, Feb. 1998, 1 page.
MSTR115—"Banking's New Payoff: Speed", *InformationWeek*, Jan. 17, 1994, 3 pages.
MSTR116—"Nailing Down More Query Tools", *InformationWeek*, vol. 523, Apr. 17, 1995, 7 pages.
MSTR117—Raden, "Data, Data Everywhere", *Information Week*, Oct. 30, 1995, pp. 60-65.
MSTR118—"Back-to-Back Upgrades—Vendors Introduce Reporting, Query Tools", *InformationWeek*, No. 598, Sep. 23, 1996, 1 page.
MSTR119—"Desktop OLAP Tools—If the Tool Fits, Use It—Online Analytical Processing Tools Offer Ease of Use for Data Retrieval and Analysis with Minimal User Training", *InformationWeek*, No. 605, Nov. 11, 1996, 3 pages.
MSTR120—"Pilot Gets Serious About OLAP", *Information Week*, Jul. 20, 1998, pp. 55-59.
MSTR121—"Oracle Announces Next Generation Oracle Express Server 6.0", M2 Presswire, Aug. 7, 1996, 5 pages.
MSTR122—"Andyne Updates GQL", *Newsbytes*, Jul. 12, 1994, 1 page.
MSTR123—"Andyne Computing Has Released Version 3.2.2 of Its GQL Query Software for Macintosh, Windows and Unix Platforms", *Newsbytes News Network*, Jul. 12, 1994, 4 pages.
MSTR124—"Data Access is Key to Warehousing Success", Open Systems Today, Oct. 3, 1994, 2 pages.
MSTR125—Phillips, "Crystal Eyes OLAP Engine", *PC Week*, vol. 13, No. 4, Jan. 29, 1996, 3 pages.
MSTR126—Dyck, "New Report Writer Spruces Up GQL", *PC Week*, vol. 14, No. 3, Jan. 20, 1997, 1 page.
MSTR127—"New Decision Suite 3.0 From Information Advantage Raises the Bar for Enterprise Decision Support", *Newswire*, Aug. 8, 1995, 3 pages.
MSTR128—"Andyne's Intranet Strategy Brings Dss to the Web; Company Aims to Dramatically Broaden Scope of Reporting, Online Analysis", *PR Newswire*, Sep. 18, 1996, 11 pages.
MSTR129—"NCR Adds OLAP Services to Extend and Expand Decision Support Capabilities of Teradata Database", *PR Newswire*, May 28, 1998, 3 pages.
MSTR130—"DecisionSuite 3.5", *SoftBase*, Sep. 12, 1996, 2 pages.
MSTR131—"IBM Acquires ITI's KnowledgeX Technology to Enhance Business Intelligence Solutions", *Software News*, Jul. 23, 1998, 1 page.
MSTR132—"Microstrategy Talks Crystal Balls", Software Futures, Apr. 1, 1997, 4 pages.
MSTR133—"Document Agent Administrator's Guide", Revision 3, BusinessObjects, Version 4.0, pp. 1-29, © 1996.
MSTR134—"Document Agent Server Administrator's Guide", Revision 4, BusinessObjects, Version 4.1, pp. 1-33, © 1996, 1997.
MSTR135—"Getting Started with Reports", Revision 2, BusinessObjects, Version 4.0, pp. 1-53, © 1996.
MSTR136—"Getting Started with Reports", Revision 3, BusinessObjects, Version 4.1, pp. 1-53, © 1997.
MSTR137—"User's Guide", Revision 3, BusinessObjects, Version 4.0, pp. 1-251, © 1996.
MSTR138—"User's Guide", Revision 4, BusinessObjects, Version 4.1, pp. 1-287, © 1997.
MSTR139—"United EasyUpdate", United Airlines, printed from http://www.ual.com/page/article/0,1360,1974,00.html, printed Nov. 30, 2002, 4 pages.
MSTR140—General Magic, Inc. website, printed from http://www.genmagic.com, printed Nov. 30, 2002, 16 pages.
MSTR142—Lehner, Wolfgang, "Modeling Large Scale OLAP Scenarios", University of Erlangen-Nuremberg, Dept. of Database Systems, Germany, 1998, pp. 1-15.
MSTR143—"Sybase Announces General Availability of Warehouse Studio", *PR Newswire*, New York, Jun. 23, 1998, two pages.

MSTR144—Schmandt, Chris, "Phoneshell: the Telephone as Computer Terminal", *Proceedings of ACM Multimedia '93*, New York, Aug. 1993, pp. 373-382.
MSTR145—Roy, Deb. K., et al., "NewsComm: A Hand-Held Interface for Interactive Access to Structured Audio", *CHI '96 Conference Proceedings*, Vancouver, Canada, Apr. 1996, pp. 173-180.
MSTR146—Roy, Deb Kumar, "NewsComm: A Hand-Held Device for Interactive Access to Structured Audio", Masters Thesis, *MIT Media Laboratory*, 1995.
MSTR147—Emnett, Keith, et al., "Synthetic News Radio", *IBM Systems Journal*, vol. 39, Nos. 3.& 4, 2000, pp. 646-659.
MSTR148—MicroStrategy: "MicroStrategy Announces the General Availability of DSS Broadcaster", *Business Wire*, Aug. 11, 1998, Proquest #32759243.
MSTR149—Intrepid Systems: "Intrepid Systems to Integrate DSS Broadcaster with Its "DecisionMaster" Decision Support Solution; Non-PC Users Benefit from Receiving High-Impact, Mission Critical Information", *Business Wire*, Aug. 11, 1998, Proquest #32760823.
MSTR150—MicroStrategy: "MicroStrategy's DSS Broadcaster Supports Personal Digital Assistants and Advanced Wireless Data Devices", *Business Wire*, Sep. 8, 1998, Proquest #33719588.
MSTR151—Mills, Mike, "Putting the Internet in Your Hand; Nokia's Phone/Palmtop Computer Offers a Glimpse of the Future", *The Washington Post*, Jun. 29, 1998, Proquest #30839088.
MSTR152—Spyglass Prism Concepts and Applications, 1997, Spyglass, Inc., pp. 1-8.
MSTR153—Spyglass White Paper; Spyglass Product Strategy: Making Devices work with the Web, 1997, Spyglass, Inc., pp. 1-9.
MSTR154—Kane, Margaret, "Microsoft Acquires Hotmail", *ZDNet News*, Dec. 30, 1997, 2 pages.
MSTR155—Emnett, Keith, et al., "Synthetic Audio Newscast", *The MIT Media Laboratory*, alleged Dec. 1998, pp. 1-2.
MSTR156—Kylänpää, Markku, "Mobile Multimedia White Paper", http://www.vtt.fi/tte/projects/mobmulti/mobmulti.html, last modified Oct. 12, 1998, 8 pages.
MSTR157—Ewen, Edward F., et al., "Data Warehousing in an Integrated Health System; Building the Business Case", *Proceeding of the ACM First International Workshop on Data Warehousing and OLAP*, 1998, pp. 47-53.
MSTR159—Kurz, Andreas, et al., "Data Warehousing within Intranet: Prototype of a Web-Based Executive Information System", *Proceedings of the 8th International Workshop on Database and Expert Systems Applications*, 1997, pp. 627-632.
MSTR161—MicroStrategy: "MicroStrategy Customers Embrace DSS Broadcaster", *Business Wire*, Aug. 11, 1998, 4 pages, Proquest #32763756.
MSTR162—MicroStrategy: "MicroStrategy Introduces DSS StockMarket", *Business Wire*, Jun. 16, 1998, 3 pages, Dialog File 20 #01940188.
MSTR163—Lucent: Gohring, Nancy: "Text-to-Speech Moves Along", *Telephony*, Aug. 24, 1998, v235n8pg56, 3 pages, Proquest #33418136.
MSTR164—Lucent: "Lucent Technologies Unveils Powerful New Speech Software", *Business Wire*, Aug. 24, 1998, 3 pages, Proquest #33311728.
MSTR165—Vertigo Delivers an Unprecedented Level of Personalized Webcasting with I-Casting, *Business Wire*, Mar. 10, 1997, 3 pages.
MSTR166—MicroStrategy: MicroStrategy to Launch DSS Broadcaster, *M2 Presswire*, Feb. 27, 1998, 2 pages.
MSTR167—Wikipedia, definition of "Push Technology", printed from http://en.wikipedia.org/wiki/Push_technology, printed on Jan. 17, 2006, 1 page.
MSTR168—"Travelocity.com—airline tickets, hotel accommodations and car reservation online" online, Feb. 9, 1999 retrieved on Jan. 10, 2006. Retrieved from the Internet: <URL:http://web.archive.org/web/19990209191411/www2.travelocity.com/ttools/freqtrav.html.
MSTR169—Elkins, Steven B., "Open OLAP", *DBMS*, Apr. 1998, Available at http://dbmsmag.com/9804d14.html, 7 pages.

(56) References Cited

OTHER PUBLICATIONS

MSTR170—Chaudhuri, Surajit, et al., "An Overview of Data Warehousing and OLAP Technology", *ACM SIGMOD Records*, vol. 26, Issue 1, Mar. 1997, pp. 65-74, 21 pages.
MSTR171—"Southwest Airlines Home Gate" online, Apr. 16, 1999 retrieved on Oct. 3, 2006. Retrieved from the Internet: <URL:http://web.archive.org/web/19990418061835/southwest.com/luvhome.html>, 19 pages.
MSTR172—Mukherjee et al., "A New Voice-Data Integrated Protocol for Unidirectional Broadcast Bus Networks", *IEEE*, Mar. 1988, pp. 813-822.
MSTR173—Brent, Paul, "GlobeStar Mates PCs with the Telephone", *Financial Post*, Apr. 13, 1996, Toronto, Ontario, p. T.13.
MSTR174—Stevens, Kimberly, "What's This? Reserved Seats at the Movies?", *New York Times*, Jan. 11, 1998, New York, New York, p. 9.5, 2 pages.
MSTR175—Stedman, Craig, "Warehouses Send Answers in E-Mail", *Computer World*, vol. 32, No. 13, Mar. 30, 1998, pp. 53-54.
MSTR176—Thyfault, Mary E., "Voice Recognition Enters the Mainstream", *Information Week*, No. 639, Jul. 14, 1997, p. 20.
MSTR177—Dillon, Nancy, "Will U.S. Sanctions Restrict Indian Coders?", *Computer World*, vol. 32, No. 23, Jun. 8, 1998, p. 20.
MSTR178—Fairbank, Katie, "At Your Command Voice-Prompted Software Assists Fliers via Computer", *Fort Worth Star—Telegram*, Fort Worth, Texas, Aug. 10, 1998, ProQuest, p. 1.
MSTR179—Sherter, Alain, "Are Banks Flirting with Disaster?", *Bank Technology News*, vol. 12, No. 8, Aug. 1999, Speech recognition speaks volumes, 4 pages.
MSTR180—Schmandt, Chris, "Phoneshell: The Telephone as Computer Terminal", M.I.T. Media Laboratory, Aug. 1993, 10 pages.
MSTR181—"Amaxis Announces Information Broadcasting Applications for the Pharmaceutical Industry; MicroStrategy's DSS Broadcaster Used to Deliver Information to Pharmaceutical Sales Managers", Business Editors & Technology Writers, *Business Week*, New York, Aug. 11, 1998, ProQuest, 2 pages.
MSTR182—"MicroStrategy Announces 35-city Seminar Series with IBM on How to Deliver Personalized Business Intelligence Throughout the Enterprise Using DSS Broadcaster", Business Editors, *Business Wire*, New York, Jul. 22, 1998, ProQuest, 3 pages.
MSTR183—Callaghan, Dennis, "MicroStrategy Broadcasts Data to Enterprise", *Midrange Systems*, Spring House, vol. 11, Issue 15, Oct. 19, 1998, ProQuest, p. 58.
MSTR184—"MicroStrategy Introduces DSS Broadcaster—The Industry's First Information Broadcast Server", Business Editors/Computer Writers, *Business Wire*, New York, Mar. 23, 1998, ProQuest, 4 pages.
MSTR185—Davis, Beth, "PeopleSoft Readies Update to ERP Apps", *Information Week*, No. 751, Personalized information, Sep. 6, 1999, p. 24.
MSTR186—MicroStrategy.com web pages, MicroStrategy, Inc., Feb. 1999, 13 pages. Available in Internet Archive Wayback Machine, search for http://microstrategy.com.
MSTR187—Anonymous, "IBM's SpeechML is All Talk", *Web Techniques*, San Francisco, May 1999, vol. 4, Issue 5, p. 13, 2 pages.
MSTR188—Seneff, Stephanie, et al., "Interactive Problem Solving and Dialogue in the ATIS Domain", Human Language Technology Conference, Proceedings of the Workshop on Speech and Natural Language, 1991, pp. 354-359, 9 pages.
MSTR189—Sheth, Beerud, et al., "Evolving Agents for Personalized Information Filtering", *Proceedings of the Ninth Conference on Artificial Intelligence for Applications*, Mar. 1-5, 1993, pp. 345-352.
MSTR190—"Microsoft Intranet Strategy Whitepaper", Microsoft Corporation, Jun. 1996, pp. 1-24.
Litigation Document: *Complaint for Patent Infringement*; Oct. 30, 2001.
Litigation Document: *Answer and Counterclaims of Defendants*; Dec. 20, 2001.
Litigation Document: *Reply to Counterclaim*; Dec. 28, 2001.
Litigation Document: *Response to Business Objects, S.A. To Microstrategy . . .* ; Feb. 22, 2002.
Litigation Document: *Report of J. Michael Thesz Pursuant to Rule 26 . . .* ; Apr. 18, 2002.
Litigation Document: *Expert Report of Michael J. Franklin*; Apr. 18, 2002.
Litigation Document: *Expert Report of Walter G. Rudd*, Apr. 18, 2002.
Litigation Document: *Expert Report of John R. Hubbard*, May 20, 2002.
Litigation Document: *Expert Report of Jack D. Grimes*; May 20, 2002.
Litigation Document: *Expert Witness Report of John F. Witherspoon*; May 20, 2002.
Litigation Document: *Supplemental Expert Report of Walter G. Rudd*; May 20, 2002.
Litigation Document: *Responsive Expert Report of Walter G. Rudd*; May 20, 2002.
Litigation Document: *Rebuttal Expert Report of Walter G. Rudd*; Jun. 4, 2002.
Litigation Document: *Rebuttal Expert Report of Michael J. Franklin*; Jun. 4, 2002.
Litigation Document: *Order and Opinion*; Jun. 12, 2002.
'050 Re-Exam: *Office Action*; mailed Mar. 27, 2002.
'050 Re-Exam: *Patent Owner's Statement*; Jun. 25, 2002.
'050 Re-Exam: *Information Disclosure Statement filed with Patent Owner's Statement*; Jun. 25, 2002.
'050 Re-Exam: *Supplemental I.D.S. filed with Patent Owner's Statement*; Oct. 9, 2002.
'050 Re-Exam: *Requester's Reply*, Aug. 26, 2002.
'033 Re-Exam: *Request for Reexamination of U.S. Pat. No. 6,279,033 B1*; Jan. 25, 2002.
'033 Re-Exam: *Office Action*; mailed Apr. 5, 2002.
'033 Re-Exam: *Patent Owner's Statement*; Jul. 5, 2002.
'033 Re-Exam: *Information Disclosure Statement filed with Patent Owner's Statement*; Jul. 5, 2002.
Order (Civil Action No. 03-1124-KAJ), Jan. 23, 2006, 3 pages.
Memorandum Opinion (Civil Action No. 03-1124-KAJ), Jan. 23, 2006, 32 pages.
PUSHing Information Delivery Using VIT's deliveryMANAGER; The Cure for Information Overload, Database Associates International, Prepared for VIT, Inc., Dec. 1997, 30 pages.
*Delivery*AGENT™ User's Guide, VIT, Dec. 29, 1997, 118 pages.
*Delivery*ADMIN™ User's Guide, VIT, copyright 1998, 174 pages.
Seagate Crystal Info Getting Started Guide, Seagate Software, Inc., copyright 1997, 90 pages.
Seagate Crystal Info OLAP User's Guide, Seagate Software, Inc., copyright 1997, 212 pages.
Seagate Crystal Info Administrator's Guide, Seagate Software, Inc., copyright 1997, 214 pages.
Seagate Crystal Info Desktop User's Guide, Seagate Software, Inc., copyright 1997, 144 pages.
Seagate Crystal Info™ 6, Info Administrator Training Guide, Seagate Software, Inc., copyright 1998, 169 pages.
Seagate Crystal Info™ Evaluator's Guide, Version 6, Seagate Software, Inc., copyright 1997, 96 pages.
Seagate Crystal Info™ 6.0 Design Guide for Reports & Queries, Seagate Software, Inc., copyright 1997, 674 pages.
Seagate Info™ Desktop User's Guide, Version 7, Seagate Software, Inc., copyright 1998, 420 pages.
Tanler, Richard, et al., "The Intranet Data Warehouse", *Information Management Magazine*, Feb. 1998, 7 pages.
Tanler, Richard, *The Intranet Data Warehouse*, copyright 1997, published by John Wiley & Sons, Inc., 357 pages.
Claim Chart for U.S. Pat. No. 6,173,310 Primarily in View of U.S. Pat. No. 5,781,911, Jan. 24, 2012, 18 pages.
Claim Chart for U.S. Pat. No. 6,173,310 in View of U.S. Pat. No. 6,442,598, Jan. 24, 2012, 19 pages.
Claim Chart for U.S. Pat. No. 6,173,310 Primarily in View of the MicroStrategy System, Jan. 24, 2012, 12 pages.
Analysis of U.S. Pat. No. 7,330,847 Based on U.S. Pat. No. 5,781,911, Jan. 24, 2012, 16 pages.

(56) References Cited

OTHER PUBLICATIONS

Analysis of U.S. Pat. No. 7,330,847 Based on U.S. Pat. No. 6,442,598, Jan. 24, 2012, 17 pages.
Analysis of U.S. Pat. No. 7,330,847 Based on the Tanler Book, Jan. 24, 2012, 35 pages.
Analysis of U.S. Pat. No. 6,173,393 Based on U.S. Pat. No. 5,781,911, Jan. 24, 2012, 34 pages.
Analysis of U.S. Pat. No. 6,269,393 Based on the Tanler Book, Jan. 24, 2012, 98 pages.
"The Microsoft Data Warehousing Strategy", SQL Server 7.0, Jul. 11, 1998, 20 pages.
"Microsoft Releases Specification for Universal OLAP Data Access", Microsoft News Center, Sep. 9, 1997, 2 pages.
Seagate Crystal Reports™ 6.0 User's Guide, Seagate Software, Inc., copyright 1997, 712 pages.
Expert Report of Richard Tanler on Behalf of Emma, Inc. Concerning the Invalidity of U.S. Pat. No. 6,173,310; 6,269,393; 6,996,569; and 7,330,847, dated Mar. 18, 2012, 46 pages.
Expert Report of Thomas A. Tinsley on Behalf of Defendant Emma, Inc. Concerning the Validity of U.S. Pat. No. 6,173,310, U.S. Pat. No. 6,269,393, U.S. Pat. No. 6,966,569 and U.S. Pat. No. 7,330,847, dated Mar. 23, 2012, 133 pages.
Claim Chart for U.S. Pat. No. 6,996,569 in View of U.S. Pat. No. 6,785,668, Jan. 24, 2012, 14 pages.
Claim Chart for U.S. Pat. No. 6,996,569 in View of U.S. Pat. No. 7,120,628, Jan. 24, 2012, 14 pages.
Claim Chart for U.S. Pat. No. 6,996,569 in View of the Tanler Book, Jan. 24, 2012, 37 pages.
"MicroStrategy Announces DSS Web 5.0; DSS Web Introduces the Web-Cast of Decision Support", Jan. 5, 1998, Vienna, Virginia, 2 pages.
Krill, Paul, "Push Technology Added to Web-Based Decision Support"; *InfoWorld Electric*, Dec. 29, 1997, 2 pages.
"What's New in DSS Web 5.0", Jan. 20, 1998, 2 pages.
"Analysis Via the Web"; *Tech Web*, Issue 662; Section: Top of the Week, Dec. 22, 1997, CMP Media Inc., 2 pages.
"News Digest", *PC Week*, Dec. 31, 1997, 3 pages.
"MicroStrategy Announces DSS Agent 5.1; Industry's Leading ROLAP Interface Extends its Reporting Functionality, Provides Performance Enhancements & Offers Support for Informatica's PowerMart", Dec. 8, 1997, Vienna, Virginia, 2 pages.
"Intranet Agents—Hide & Seek", computing.co.uk, *Newmedia Newmedia, Computing*, Feb. 19, 1998, 5 pages.
Goodheart, Steve; "MicroStrategy's DSS Web Increases Profits for Littlewoods; MicroStrategy Incorporated—DSS Web", *Information Management Magazine*, Mar. 1998, 3 pages.
"MicroStrategy, Naviant Announce Financial Services Marketing Solution", Oct. 21, 1997, 3 pages.

\* cited by examiner

SYSTEM AND METHOD FOR MANAGEMENT OF AN AUTOMATIC OLAP REPORT BROADCAST SYSTEM

RELATED APPLICATIONS

This application is a continuation of U.S. patent application Ser. No. 12/029,004, filed Feb. 11, 2008 (issued as U.S. Pat. No. 8,321,411 on Nov. 27, 2012), which is a continuation of U.S. patent application Ser. No. 10/339,579, filed Jan. 10, 2003 (issued as U.S. Pat. No. 7,330,847 on Feb. 12, 2008), which is a continuation of U.S. patent application Ser. No. 09/345,440, filed Jul. 1, 1999 (issued as U.S. Pat. No. 6,567,796 on May 20, 2003), which claims priority to U.S. Provisional Patent Application Ser. No. 60/126,055, filed Mar. 23, 1999.

FIELD OF THE INVENTION

This invention relates to a system and method for managing automatic broadcasting of information derived from on-line analytical processing system reports to subscriber devices, including electronic mail, personal digital assistants, pagers, facsimiles, printers, mobile phones, and telephones, based on subscriber-specified criteria.

BACKGROUND OF THE INVENTION

The ability to act quickly and decisively in today's increasingly competitive marketplace is critical to the success of any organization. The volume of data that is available to organizations is rapidly increasing and frequently overwhelming. The availability of large volumes of data presents various challenges. One challenge is to avoid inundating an individual with unnecessary information. Another challenge is to ensure all relevant information is available in a timely manner.

One known approach to addressing these and other challenges is known as data warehousing. Data warehouses, relational databases, and data marts are becoming important elements of many information delivery systems because they provide a central location where a reconciled version of data extracted from a wide variety of operational systems may be stored. As used herein, a data warehouse should be understood to be an informational database that stores shareable data from one or more operational databases of record, such as one or more transaction-based database systems. A data warehouse typically allows users to tap into a business's vast store of operational data to track and respond to business trends that facilitate forecasting and planning efforts. A data mart may be considered to be a type of data warehouse that focuses on a particular business segment.

Decision support systems have been developed to efficiently retrieve selected information from data warehouses. One type of decision support system is known as an on-line analytical processing system ("OLAP"). In general, OLAP systems analyze the data from a number of different perspectives and support complex analyses against large input data sets.

There are at least three different types of OLAP architectures—ROLAP, MOLAP, and HOLAP. ROLAP ("Relational On-Line Analytical Processing") systems are systems that use a dynamic server connected to a relational database system. Multidimensional OLAP ("MOLAP") utilizes a proprietary multidimensional database ("MDDB") to provide OLAP analyses. The main premise of this architecture is that data must be stored multidimensionally to be viewed multidimensionally. A HOLAP ("Hybrid On-Line Analytical Processing") system is a hybrid of these two.

ROLAP is a three-tier, client/server architecture comprising a presentation tier, an application logic tier and a relational database tier. The relational database tier stores data and connects to the application logic tier. The application logic tier comprises a ROLAP engine that executes multidimensional reports from multiple end users. The ROLAP engine integrates with a variety of presentation layers, through which users perform OLAP analyses. The presentation layers enable users to provide requests to the ROLAP engine. The premise of ROLAP is that OLAP capabilities are best provided directly against a relational database, e.g., the data warehouse.

In a ROLAP system, data from transaction-processing systems is loaded into a defined data model in the data warehouse. Database routines are run to aggregate the data, if required by the data model. Indices are then created to optimize query access times. End users submit multidimensional analyses to the ROLAP engine, which then dynamically transforms the requests into SQL execution plans. The SQL is submitted to the relational database for processing, the relational query results are cross-tabulated, and a multidimensional result set is returned to the end user. ROLAP is a fully dynamic architecture capable of utilizing pre-calculated results when they are available, or dynamically generating results from atomic information when necessary.

The ROLAP architecture directly accesses data from data warehouses, and therefore supports optimization techniques to meet batch window requirements and to provide fast response times. These optimization techniques typically include application-level table partitioning, aggregate inferencing, denormalization support, and multiple fact table joins.

MOLAP is a two-tier, client/server architecture. In this architecture, the MDDB serves as both the database layer and the application logic layer. In the database layer, the MDDB system is responsible for all data storage, access, and retrieval processes. In the application logic layer, the MDDB is responsible for the execution of all OLAP requests. The presentation layer integrates with the application logic layer and provides an interface through which the end users view and request OLAP analyses. The client/server architecture allows multiple users to access the multidimensional database.

Information from a variety of transaction-processing systems is loaded into the MDDB System through a series of batch routines. Once this atomic data has been loaded into the MDDB, the general approach is to perform a series of batch calculations to aggregate along the orthogonal dimensions and fill the MDDB array structures. For example, revenue figures for all of the stores in a state would be added together to fill the state level cells in the database. After the array structure in the database has been filled, indices are created and hashing algorithms are used to improve query access times.

Once this compilation process has been completed, the MDDB is ready for use. Users request OLAP reports through the presentation layer, and the application logic layer of the MDDB retrieves the stored data.

The MOLAP architecture is a compilation-intensive architecture. It principally reads the pre-compiled data, and has limited capabilities to dynamically create aggregations or to calculate business metrics that have not been pre-calculated and stored.

The hybrid OLAP ("HOLAP") solution is a mix of MOLAP and relational architectures that support inquiries against summary and transaction data in an integrated fashion. The HOLAP approach enables a user to perform multidimensional analysis on data in the MDDB. However, if the user reaches the bottom of the multidimensional hierarchy and requires more detailed data, the HOLAP engine generates an SQL to retrieve the detailed data from the source relational database management system ("RDBMS") and returns it to the end user. HOLAP implementations rely on simple SQL statements to pull large quantities of data into the mid-tier, multidimensional engine for processing. This constrains the range of inquiry and returns large, unrefined result sets that can overwhelm networks with limited bandwidth.

As described above, each of these types of OLAP systems are typically client-server systems. The OLAP engine resides on the server side and a module is typically provided at a client-side to enable users to input queries and report requests to the OLAP engine. Current client-side modules are typically stand alone software modules that are loaded on client-side computer systems. One drawback of such systems is that a user must learn how to operate the client-side software module in order to initiate queries and generate reports.

Although various user interfaces have been developed to enable users to access the content of data warehouses through server systems, many such systems experience significant drawbacks. All of these systems require that the user connect via a computer system to the server system to initiate reports and view the contents of the reports.

Moreover, current systems require that the user initiate a request for a report each time the user desires to have that report generated. A particular user may desire to run a particular report frequently to determine the status of the report.

Further, reports may be extensive and may contain a large amount of information for a user to sort through each time a report is run. A particular user may only be interested in knowing if a particular value or set of values in the report has changed over a predetermined period of time. Current systems require the user to initiate the new report and then scan through the new report to determine if the information has changed over the time period specified.

These and other drawbacks exist with current OLAP interface systems.

SUMMARY OF THE INVENTION

An object of the invention is to overcome these and other drawbacks in existing systems.

Another object of the present invention is to provide a system that manages and controls the automatic broadcast of messages to subscribers based on criteria established by the subscriber when those criteria are determined to be satisfied by an on-line analytical processing system.

Another object of the present invention is to provide a subscriber-based system for automatic broadcast of OLAP reports that enables a system administrator to monitor performance and output of the system.

Another object of the present invention is to provide a subscriber-based system for automatic broadcast of OLAP reports that enables a system administrator to view subscribers to various services of the system.

Another object of the present invention is to provide a subscriber-based system for automatic broadcast of OLAP reports that enables a system administrator to manage the scheduling of services to output reports.

Another object of the present invention is to provide a subscriber-based system for automatic broadcast of OLAP reports that stores an address book for subscribers of the system and enables a system administrator to modify and maintain the address book.

Another object of the present invention is to provide a subscriber-based system for automatic broadcast of OLAP reports that enables use of dynamic recipient lists that are rendered to determine who receives output from the system.

These and other objects are realized by a system and method according to the present invention as described below. Such a system and method comprises a broadcast module that connects to an on-line analytical processing (OLAP) system comprising a server system for accessing information in one or more data warehouses to perform report analysis. The broadcast module may enable the defining of a service. A "service" as used herein should be understood to include one or more reports that are scheduled to be run against one or more data warehouses, relational databases, files in a directory, information from web or file transfer protocol sites, information provided by a custom module, by a server system. These services may be subscribed to by users or user devices to enable the broadcast module to determine who should receive the results of a service. The broadcast module enables the creation of a service, the scheduling of the service, subscription of users to the defined services, generation of reports for the service, formatting of outputs of the service and broadcasting of messages based on the output for the service, among other functions.

Also, an administrator module may be provided that manages automatic generation of output from the on-line analytical processing system. The administrator module manages the operation of the service processing system to increase throughput, increase speed, and improve the administrator control over the processing. The system may maintain dynamic recipient lists that are resolved by system. The system enables administrator control over processing by enabling administrators to view all services and all subscribers of the system, by maintaining an address book containing entries for subscribers of the service and enabling the administrator to view the contents of the address book, and by scheduling processing of services. The system also governs the volume of services being processed, the number of subscribers to a particular service, and the number of output devices to which a service may be broadcast.

According to one embodiment of the present invention, a system for automatically generating output from an on-line analytical processing system based on scheduled services specified by subscribers of the system is provided. The system processes scheduled services in an on-line analytical processing system with each service comprising at least one query to be performed by the on-line analytical processing system. The system then automatically forwards output from the services to one or more subscriber output devices specified for that service. The system may also provide management of the output devices. Users may define new services, including the schedule of the services and the type, such as alert services or scheduled services, and may also subscribe to the services provided by the system. If an alert service is processed, the system may forward output only when one or more alert criteria are satisfied. Subscribers may be specified by a dynamic recipient list that is resolved each time the service is processed to determine recipients of the service output. A dynamic recipient list may be, for example, a list that determines the recipients of a service based on dynamically resolved criteria. For example, a bank may generate a list every month that identifies customers who have an account balance greater than $100,000 and who have not made a transaction within the last three months. The output devices the system may forward output to may comprise electronic mailbox, facsimile, printer, mobile phone, telephone, pager, PDA or web pages.

According to another embodiment of the present invention, a system that enables subscribers to personalize services used for automatically generating output from an on-line analytical processing system is provided. In addition to enabling subscribers to specify the content and schedule of one or more services, the system enables subscribers to personalize various other parameters relating to the service. For example, subscribers may specify the format of service output, filters to be applied to the service, and a variety of other personalization options described in greater detail below.

According to another embodiment of the invention, the system utilizes static recipient lists ("SRL") and dynamic recipient lists ("DRL") for determining subscribers to a service. SRLs may be a list of manually entered subscriber names of a particular service. DRLs, however, may be a report generated by the system listing subscriber names that meet a predetermined criteria for a service. DRLs enable lists of subscribers to change according to certain criteria applied to contents of a database. For example, a DRL may be used to broadcast a sales report to only those subscribers who are managers of stores who have not met a predetermined sales goal.

Other objects and advantages of the present invention will be apparent to one of ordinary skill in the art upon reviewing the detailed description of the present invention.

DETAILED DESCRIPTION OF THE PREFERRED EMBODIMENTS

Figure 1:
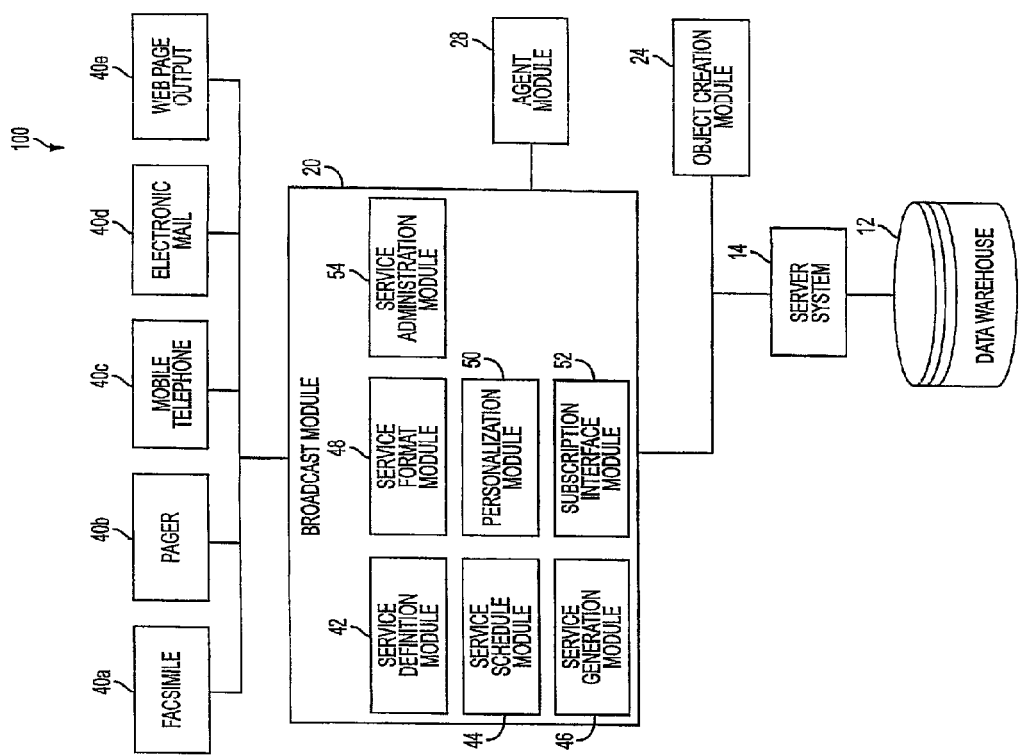
FIG. 1 is a schematic block diagram of a system in accordance with an embodiment of the present invention.
Figure 2:
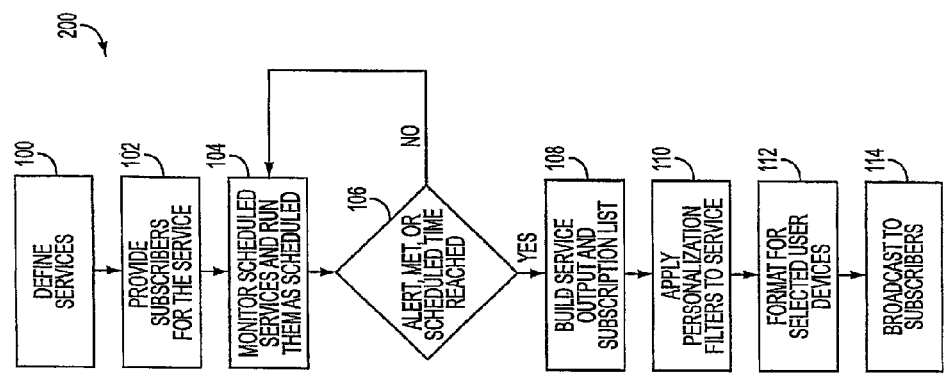
FIG. 2 is a schematic block diagram of a method for automatic transmission of OLAP report information.

According to one embodiment of the present invention, a system is provided for automatic transmission of OLAP report output to one or more of a plurality of user output devices. FIG. 1 depicts an embodiment of a system 100 according to the present invention. System 100 may comprise a data warehouse 12, a server system 14, a broadcast module 20, an object creation module 24, an agent module 28, and one or more user devices 40. User devices 40 may comprise a facsimile 40*a*, pager 40*b*, mobile telephone 40*c*, electronic mail 40*d*, and web page output 40*e*.

Broadcast module 20 may comprise a module that broadcasts personalized information derived from the OLAP system (e.g., data warehouse 12 and sever system 14) to users via one or more user devices 40 such as electronic mail, PDA, facsimile, printer, pager, mobile phone, telephone, and multiple other types of user information devices. Broadcast module 20 enables users to define services (e.g., queries and reports) that are to be run against an OLAP system such as server system 14 and data warehouse 12 based on a predetermined schedule. A "service" as used herein should be understood to include one or more reports that are scheduled to be run against data warehouse 12 by server system 14. Broadcast module 20 also enables users on the system to subscribe to one or more services and then broadcast module 20 outputs the results of these services to subscribers according to criteria established by the subscribers.

Data warehouse 12 may comprise any data warehouse or data mart as is known in the art, including a relational database management system ("RDBMS"), a multidimensional database management system ("MDDBMS") or a hybrid system. Server system 14 may comprise an OLAP server system for accessing and managing data stored in data warehouse 12. Server system 14 may comprise a ROLAP engine, MOLAP engine or a HOLAP engine according to different embodiments. Specifically, server system 14 may comprise a multithreaded server for performing analysis directly against data warehouse 12. One embodiment of server system 14 may comprise a ROLAP engine known as DSS Server™ offered by MicroStrategy. Accordingly, data warehouse 12 and server system 14 comprise an OLAP system that connects to broadcast module 20 for broadcast of user-specified reports from data maintained by data warehouse 12.

Broadcast module 20 may also be connected to an agent module 28 which may also be connected to server system 14. Agent module 28 may be provided to define reports and queries that may be selected as part of one or more services by broadcast module 20. Agent module 28 may be used to define queries to be performed against the data contained in data warehouse 12 using components, templates, filters, reports, agents, etc. Components may include dimensions, attributes, attribute elements, and metrics—in other words, the building blocks for templates, filters, and reports. Templates generally define a report format and specify the attributes, dimensions, metrics, and display properties comprising a report. Filters generally qualify report content and identify a subset of data warehouse 12 to be included in a report. For example, filters may be used with set math, multidimensional qualifications, and metric qualifications. Using set math, users can define and embed any set of limiting criteria (e.g., union, intersect, exclude). Multidimensional qualifications enable users to indicate general subject areas or perspectives on data (e.g., time, geography, product). Metric qualifications may be used to compute mathematical calculations of various numerical data (e.g., total sales, profit, cost, percent change, profit). Metrics may be displayed in a variety of formats (e.g., percentages, currency, fonts indicating predetermined values). Reports are generally understood to be a data analysis created by combining a template (the format) with a filter (the content). Agents may be a group of reports cached on a time- or event-based schedule for rapid retrieval and batch processing. According to one embodiment of the invention, agent module 28 may comprise a software package known as DSS Agent™ offered by MicroStrategy.

Agent module 28 may operate on any user system 26 including personal computers, network workstations, laptop computers or any other electronic device connected to server system 14 or may comprise an object connected to broadcast module 20.

Broadcast module 20 therefore, cooperates with server system 14 and agent module 28 to send personalized information to users at predefined intervals or when criteria specified in reports defined through either broadcast module 20 or agent module 28 exceed predefined thresholds. To provide this functionality, broadcast module 20 enables users of the system to create services that run against the OLAP system to generate information and subscriptions that specify the recipients of the information derived from a service. A service may comprise one or more reports that are processed by the OLAP system and may be a specific report, series of reports or elements within a report. Also, subscribers may include users, groups of users or only specific user devices 40 for a particular user. Services may be based on predefined reports from broadcast module 20 or agent module 28 or may be based on filter/template combinations set up through broadcast module 20 and/or agent module 28.

Once services have been defined and subscribers to that services are established, broadcast module 20 continually monitors the schedules for the services, runs the scheduled reports, and automatically generates outputs where conditions specified in the service are satisfied using push technology. Outputs from broadcast module 20 may be personalized to subscriber demands and/or formatted to meet a subscriber's user device requirements to ensure that users see only that portion of a report that is relative to that user and in a manner that is most useful for the user. Accordingly, a user can thus have up-to-date information about the contents of data warehouse 12 without having to submit a query or log-in to a software module on the user system.

To provide the functionality described above, broadcast module 20 may comprise a plurality of modules that perform certain functions. Although described as separate modules, it should be understood that such modules may be combined or separated further. In an embodiment of the present invention, as depicted in FIG. 1, broadcast module 20 may comprise a service definition module 42, a service schedule module 44, a service generation module 46, a service format module 48, a personalization module 50, a subscription interface module 52, and a service administration module 54.

Service definition module 42 of broadcast module 20 may comprise a module for enabling a user to create or modify a service. In an embodiment, the services may be defined based on reports or workbooks specified in agent module 28. Users may then subscribe to services defined in service definition module to enable broadcast module 20 to determine who should receive the results of a service.

At least two types of services may be provided—scheduled services and alert services. A schedule service may comprise a service that generates information to subscribers at a given time interval. An alert service may comprise a service that provides information to all subscribers if an alert condition is true.

Service schedule module 44 may provide the functionality to enable selection of when a service should be run. Service schedule module 44 may enable a user, administrator or other person having access thereto to specify the frequency that the service should be performed. The schedule may be based on an interval (such as every several hours, days, weeks, months, years, etc.) or on one or more specified days (such as March 15th and September 15th). Other methods of scheduling events to be processed may also be used.

Service generation module 46 may comprise a module for following a schedule set by service schedule module 44 and completing the operation specified in service definition module 42. For example, if a service were specified to run the monthly sales totals for the Midwest region of a company every weekend and generate an alert to the supervisor on Monday morning if sales drop below 5%, then service generation module 46 would be responsible to monitor the schedule of this service to ensure that the report contained therein was processed over the weekend and then generate an alert report if the criteria set in the service is satisfied. To monitor the schedule of all services specified by broadcast module 20, service generation module 46 may operate constantly to ensure that every scheduled service is completed.

Service format module 48 may be responsible for taking the results of a service and formatting it to a proper format corresponding to each of the subscribers of a particular service. Service format module 48 may be responsible for formatting service results for generation to user devices 40a-40e.

Personalization module 50 may be provided to enable subscribers to specify the content for a service in which they are interested. Users may input personalized choices for personalization module 50 through subscription interface module 52 by selecting personalization filters from filters available in the service. Personalization module 50 captures the criteria selected by the user and creates a subscription based on the selected criteria which may be multidimensional based on the data structure in the data warehouse, relational database, etc. Because personalization module 50 enables subscribers to specify the content of a service, this reduces the amount of data output to a subscriber by providing the subscriber with data that the subscriber is interested in.

Personalization may also be set in an address book module maintained by broadcast module 20. The address book may comprise an entry for each subscriber of any service on the system. That subscriber may define global personalization filters to be applied to all services to which the subscriber applies rather than providing personalization on only a service by service basis. For a chosen user, personalization may also be set on a project level basis. For example, a project may comprise multiple reports. Each report within a project may have different personalized filters applied according to user desires. Personalization module 50, however, also enables subscribers to personalize the entire rather than doing so for each. For example, subscribers may assign particular operations to be performed for each of the reports within a project. This enables subscribers to personalize multiple reports simultaneously.

Additionally, subscribers may personalize style parameters using, for example, personalization module 50. Styles may be used to tailor a display format of a report to a particular device (e.g., pager, electronic mail, facsimile). Styles may be designed according to the needs of each subscriber depending on the characteristics and properties of a recipient. For example, a user may desire to have pages generated from the report sent in a particular format and may set up that format using styles.

Further, in the address book, the data warehouse login and password may also be stored to enable access to the data warehouse. Each subscriber may have multiple addresses in the address book, each address assigned to a different output device. Thereby, a subscriber may have multiple addresses, each of which may be assigned to receive different services based on different filters, etc. This provides for the ultimate in customization for receipt of information. For example, a user may desire to get stock information via pager but sales information via e-mail. By setting up two separate addresses and applying different services and/or filters, that may be accomplished according to the present invention.

Through the address book module, administrators may also be able to add subscribers to the address book, import subscribers from other applications into the address book, create groups and add subscribers to those grounds and delete or edit information, including personalization features for subscribers. This enables administrators to also determine who all of the subscribers are and to view personalization features for each subscriber.

Subscription interface module 52 may be provided to enable users or administrators of the system to monitor and update subscriptions to various services provided by broadcast module 20. Service administration module 54 may be provided to provide administrative functions to monitor a queue to schedule services and to provide throughput of services to ensure efficient completion of those services by broadcast module 20.

Subscription interface module 52 may be used to create a subscriber list by adding one or more subscribers to a service. Users or system administrators having access to broadcast module 20 may add multiple types of subscribers to a service such as a subscriber from either a static recipient list (SRL) (e.g., addresses and groups) or a dynamic recipient list (DRL) (described in further detail below). The subscribers may be identified, for example, individually, in groups, or as dynamic subscribers in a DRL. Subscription interface module 52 permits a user to specify particular criteria (e.g., filters, metrics, etc.) by accessing data warehouse 12 and providing the user with a list of available filters, metrics, etc. The user may then select the criteria desired to be used for the service.

A SRL is a list of manually entered names of subscribers of a particular service. The list may be entered using service administration module 54 or subscription interface module 52. SRL entries may be personalized such that for any service, a personalization filter (other than a default filter) may be specified. A SRL enables different personalizations to apply for a login alias as well. For example, a login alias may be created using personalization module 50. Personalization module 50 enables subscribers to set preferred formats, arrangements, etc. for displaying service content. The login alias may be used to determine a subscriber's preferences and generate service content according to the subscriber's preferences when generating service content for a particular subscriber.

A DRL may be a report which returns lists of valid user names based on predetermined criteria that are applied to the contents of a database such as data warehouse 12. Providing a DRL as a report enables the DRL to incorporate any filtering criteria desired, thereby allowing a list of subscribers to be derived by an application of a filter to the data in data warehouse 12. In this manner, subscribers of a service may be altered simply by changing the filter criteria so that different user names are returned for the DRL. Similarly, subscription lists may be changed by manipulating the filter without requiring interaction with service administration module 54. Additionally, categorization of each subscriber may be performed in numerous ways. For example, subscribers may be grouped via agent filters. In one specific embodiment, a DRL is created using DSS Agent™ offered by Microstrategy.

Service administration module 54 enables monitoring of reports (e.g., ability to see who is using system, what reports they are generating, etc.), scheduling of reports, address book and dynamic recipient list maintenance, subscriber management, and statistics tracking. Subscriber management involves enabling system administrators to review, access, and generate information about subscribers to the system through the maintenance of detailed subscriber lists including the DRL's and SRL's. This list may track information on which subscribers subscribe to which services and vise-versa.

The present invention provides an administration console that enables organizations to rapidly implement and fully administer enterprise broadcast deployments. As briefly described above, service administration module 54 may comprise the administration console.

Service administration module 54 enables monitoring of reports (e.g., ability to see who is using system, what reports they are generating, etc.), scheduling of reports, address book and dynamic recipient list maintenance, and subscriber management. Subscriber management involves enabling system administrators to review, access, and generate information about subscribers to the system through the maintenance of detailed subscriber lists. This list may track information on which subscribers subscribe to which services and vise-versa.

According to one aspect of the present invention, service administration module 54 may comprise a service queue management system that creates and presents a service queue. The service queue may comprise a listing of all services that the system is to be running within a predetermined period of time (which may be modified by the user, for example, to extend from seconds to years). The service queue may comprise a list of upcoming service initiation times for each active service. The service queue management system monitors the services to ensure that they initiate on a predefined schedule.

The service queue management module may also present this information by subscriber to enable an administrator or a user to view the services to which that user subscribes. This enables the administrator to gain an understanding of what information that user finds helpful. The administrator may use that information to interest the user in additional information. The service queue may also be viewed by service or with all services as desired.

Further, according to one embodiment, upon selecting a service in the queue, the system may display the specifics of the service to enable the administrator to view the information sought in that service, the subscribers to that service, and modify various parameters for that service.

Service administration module 54 may also maintain the address book and dynamic recipient lists to enable administrators to review subscriber information contained in those lists. The address book may contain the name and specific settings of all valid subscribers and may interact with other address book programs for importing and exporting names.

Personalization may also be set in the address book. For a chosen user, personalization may be set for each project which is currently loaded. A personalization filter may be selected for the project. The data warehouse login and password may also be stored to enable access to the data warehouse. One or more display styles may be set up. Each subscriber may have multiple addresses in the address book, each address assigned to a different output device. Thereby, a subscriber may have multiple addresses, each of which may be assigned to receive different services based on different filters, etc. This provides for the ultimate in customization for receipt of information. For example, a user may desire to get stock information via pager but sales information via e-mail. By setting up two separate addresses and applying different services and/or filters, that may be accomplished according to the present invention.

Service administration module 54 may also be responsible for governing services to ensure that the server system does not become overloaded with the number of services being performed and that broadcast module 20 does not become overloaded with the number of messages to be broadcast. This may be performed by setting a maximum numbers of jobs that may be performed by each of these systems, a maximum number of subscribers per service or a maximum number of recipient user systems per service, for example. Other governing techniques may also be used.

Further, service administration module 54 may comprise a job reduction component that functions to limit the number of jobs submitted to server system 14. This component generates a distinct list of jobs to send to server system 14 to satisfy all services and all personalization filters for all subscribers for each service. This component may remove duplicate subscribers using the report name, login identification and personal filter values for the subscribers to the service. For example, this module may operate as follows. First, the system may associate each subscriber with a login identification and a personalization filter for that subscriber (a blank filter may be used if the user did not specify either a default or subscription level personalization filter). Duplicates may then be eliminated by comparing the personalization filters provided and grouping all subscribers requesting the same personalization filter together to generate a single report for that group and using the login identification for those subscribers to later generate individual outputs for the subscribers having that personalization filter from the single report.

Figure 3:
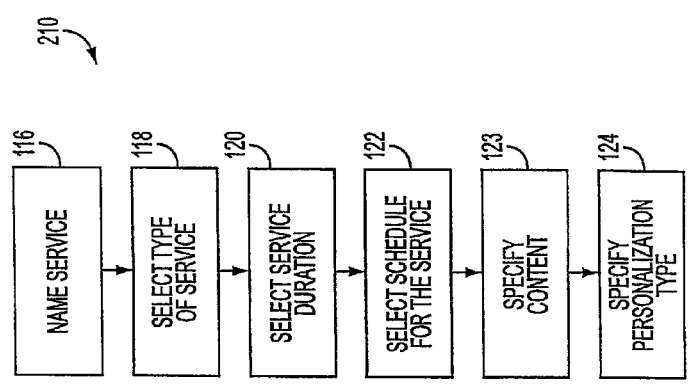
FIG. 3 is a schematic block diagram of a method for creating a service according to an embodiment of the present invention.

A method 200 of operation of system 100 is provided in FIG. 3. Method 200 comprises several steps for generating information to a plurality of user systems using "push" technology. In step 100, one or more services are defined by users or system administrators for broadcast module 20 to monitor, as described in more detail below with respect to FIG. 4, such as through service definition module 42. In step 102, subscribers for each of these various services are provided, such as through subscription interface module 52. In step 104, the system monitors and processes services according to their defined schedules. Step 104 may be performed by service schedule module 44, and/or service generation module 46, for example.

In step 106, the system determines whether an alert criteria has been met or if a scheduled service has been completed, such as through service generation module 46. If an alert criteria has not been satisfied or a scheduled service has not been completed, the system continues to monitor and process services. If an alert condition has been met, or if a scheduled service has been completed, in step 108, the system, such as through service generation module 46, builds the service output and the subscription list for that particular service. Building the subscription list for a service may involve using a recipient list resolution method. For example, a recipient list resolution (RLR) may be used to build a list of all of the subscribers to a service in step 108. This may be performed by resolving and merging all DRLs with all SRLs for a given service. All DRLs are generated and the resulting list is merged with the SRL. Typically, there is only one SRL (although additional SRLs may be used) and none to numerous DRLs per service. The list that results from merging all of the DRLs and SRLs produces a list which consolidates all subscribers of a given service.

Next, in step 110, the system, such as through personalization module 50, applies personalization filters to services that are scheduled to be output to the subscribers. Personalization filters may modify the output of a service according to the subscriber's desired criteria. The personalized outputs may then be formatted for the user device 40 selected by the user for output. Additionally, personalization module 50 may also be used to personalize the contents of one or more services as described above. In step 114, broadcast module 20 broadcasts the formatted and personalized services to subscribers at user devices 40a-40e.

Figure 4:
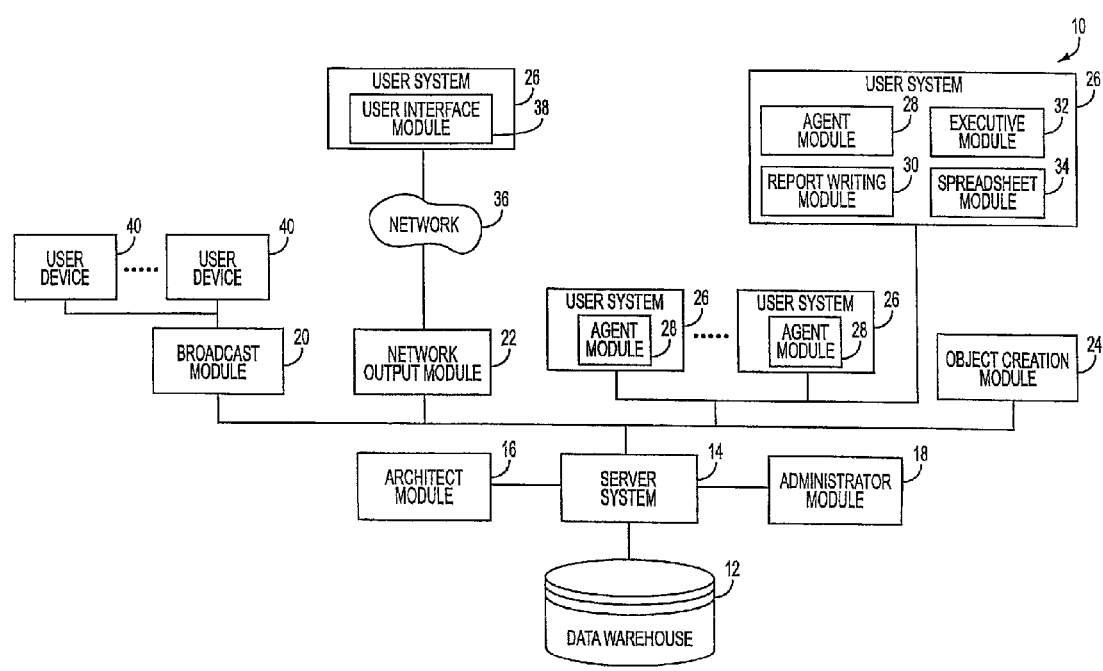
FIG. 4 is a schematic block diagram of an overall system in accordance with an embodiment of the present invention.

As described above, step 100 defines the service or services to be monitored by broadcast module 20. FIG. 4 depicts a method 210 according to one embodiment of the present invention for performing step 100. According to one embodiment, in step 116, a user may name and provide a description of the service or services to be monitored. By providing a name and description, users may be able to uniquely identify the services from an object browser or in a service queue.

Next, in step 118, the user selects the type for the service. As described above, at least two types of services may be provided. A first type, a scheduled service, is a service that is run according to a predetermined schedule and output is generated each time the service is run. An alert service is one that is run periodically as well, however, output is only generated when certain alert criteria is satisfied. If an alert service is selected by the user, the user may then specify a report or a template/filter combination upon which the alert is based. According to one embodiment, reports and template/filter combinations may be predefined by other objects in the system including agent module 28 or object creation module 24. For example, agent module 28 such as the DSS Agent™ offered by MicroStrategy, may be used to create and define reports with filters and template combinations, and to establish the alert criteria that are to be used for an alert service.

Next, in step 120, the duration of the service is input by the user. Service duration indicates the starting and stopping dates for the service. The start date is the base line for the scheduled calculation, while the end date indicates when the broadcast will cease to be sent. The user has the option of starting the service immediately or waiting until some time in the future. Various calendaring features may be provided to enable the user to easily select these start and stop dates. For example, a calendar that specifies a date with pull-down menus that allow the users to select a month and year may be provided according to known methods of selecting dates in such programs as electronic calendaring programs and scheduling programs used in other software products. One specific aid that may be provided is to provide a calendar with a red circle indicating the present date and a blue ellipse around the current numerical date in each subsequent month to more easily allow the user to identify monthly intervals. Other methods may also be used.

Next, in step 122, the user selects the schedule for the service. According to one embodiment, predefined schedules for services may be provided or the user may choose to customize the schedule for the service. If the user desires to create a new schedule, a module may be opened to enable the user to name the schedule and to set the parameters for the schedule. Schedules may be run on a several-minute, hourly, daily, monthly, semi-annual or annual basis, all depending upon what frequency is desired.

The next step, step 123, may be performed to enable the user to specify the content of a service. The content of a service is the various information reports and template/filter combinations that the server system 14 processes using the data in data warehouse 12 in order to provide the output requested for that particular service. The content of a service may comprise many different items or combination of items to suit the user's needs. For example, the user may be able to include a text grid, an agent alert, a web uniform resource location (URL), a spreadsheet container, a new sheet container, a text container, a text message, contents from a text file, or a file attachment. According to one embodiment, the system may organize these various contents into containers. A broadcast container may comprise the highest level container under which all content pieces reside. A grid may comprise an element that is associated with a report or a template/filter combination. The grid may be bound via a macro to a report/fiber and template combination. An agent alert may be associated with a particular report that is therefore incorporated within the service. Any report available on agent module 28 may be selected. The web URL item may be associated with the report through network output module 22 that specified that URL for the particular report. A spreadsheet container may be the parent of an embedded spreadsheet attachment. When created, a particular spreadsheet may be included as a child. Additionally, markup language (e.g., XML and/or HTML) documents may also be included.

After the user has named the service, selected the type, duration, and schedule for the service, the user may select the personalization type in step 124. For example, the user may select an option to either prevent personalization, require personalization, or allow personalize optionally. Upon completion of these steps, the service may be stored by service definition module 42 in a database structure to enable users to retrieve predefined services to subscribe to these services through subscription interface module 52.

Method 210 may also comprise an error condition step. An error condition step may be used to enable users to specify "error" conditions and actions. For example, an "error" condition may be a user notification that a server is "down" or that there is no data to be returned. A user may specify particular actions to be performed by the system in response to one or more error conditions. For example, a user may specify a "server" error (e.g., not responding) and indicate a particular action to be performed in response to a "server not responding" error (e.g., reattempt in a predetermined time). Various other conditions and actions may be specified.

The system described may also comprise a portion of a larger decision support system 10 as depicted in FIG. 4. System 10 may comprise a data warehouse 12, a server system 14, an architect module 16, an administrator module 18, a broadcast module 20, a network output module 22, a plurality of user systems 26, and an object creation module 24. User systems 26 may comprise an agent module 28 as described above.

Agent module 28 may enable a user access to the contents of data warehouse 12 to provide detailed analysis on an ad hoc basis. One of the advantages of DSS Agent™ includes its use of a ROLAP architecture on server system 14 and a RDBMS in data warehouse 12 to provide a more scaleable environment. Through DSS Agent™, a user can "drill down." Drilling down allows the user to dynamically change the level of detail in a report to a lower level attribute so that the resulting report displays data with a greater level of detail. For example, one can drill down from year to month to week to day. DSS Agent™ also enables users to "drill up" to a higher level attribute. Drilling up summarizes the selected data to a higher level total. For example, one can drill from day to week to month to year. DSS Agent™ also enables, a user to "drill within." Drilling within allows a user to go to a different hierarchy within the same dimension. Drilling within is often used to examine the characteristics of selected data. For example, drilling within enables a user to drill from item to color when looking at a particular retail item such as an automobile, clothing or the like. Drilling across allows the user to drill to an altogether different dimension. For example, one can drill across from a region to a month. Accordingly, through use of agent module 28, server system 14, and data warehouse 12, drilling is a powerful tool that is easily implemented using a ROLAP architecture which is not as easily accessible in MOLAP.

Architect module 16 may comprise a module that enables developers to create and maintain data and metadata in data warehouse 12. Metadata may be considered to be data about data, such as data element descriptions, data type descriptions, attributes/property descriptions, range/domain descriptions, and process/method descriptions. Data and metadata stored in data warehouse 12 may thus be modified and organized by architect module 16. According to one embodiment of the invention, architect module 16 may comprise a software package known as DSS Architect™ offered by MicroStrategy.

Administrator module 18 may comprise a module for facilitating the development, deployment, and management of data warehouse applications supporting large volumes of users over various distribution mechanisms. Administrator module 18 may comprise an object manager and a warehouse monitor. The object manager allows objects to be shared across databases for easy migration from development to production. The warehouse monitor provides performance monitoring and management tools to support thousands of users across a distributive database environment. The warehouse monitor collects statistics for the purpose of identifying performance bottlenecks, warehouse tuning, cost analysis and various other purposes. According to one embodiment of the invention, administrator module 18 may comprise a module known as DSS Administrator™ offered by MicroStrategy.

Server system 14 may also connect to an object creation module 24. Object creation module 24 may comprise an open object linking and embedding ("OLE") application program interface ("API") for custom decision support development. According to one embodiment of the invention, object creation module 24 may comprise a software module known as DSS Objects™ offered by MicroStrategy. Additionally, custom applications may interface with object creation module 24 including Delphi, Visual Basic, and C++ programming modules.

User systems 26 may also include a report writing module 30, an executive module 32, and a spreadsheet module 34. Report writing module 26 may comprise an OLAP report writer. Executive module 32 may comprise a module design tool for developing custom EIS applications. This module is a design tool for developing briefing books that provide high level users with a series of views that describe their business. Once created, end users can access briefing books through agent module 28 in EIS mode. Such a system is easily implemented with agent module 28 by compiling sets of analyses into dynamic pages that immediately focus users on their key business drivers. One embodiment of executive module 32 may comprise software known as DSS Execuutive™ offered by Micro Strategy.

Spreadsheet module 34 may comprise an add-on to existing spreadsheet programs or may comprise an entirely new spreadsheet program. Spreadsheet module 34 may enable reports and analyses generated from agent module 28 to be presented in a traditional spreadsheet program format to enable users to view results in preexisting front-end interfaces. Spreadsheet module 34 may comprise the Microsoft Excel™ spreadsheet program offered by Microsoft and/or an Excel™ Add-In program offered by MicroStrategy.

Another module for accessing content of server system 14 may comprise a network output module 22. Network output module 22 enables user system 26 access to server system 14 and data warehouse 12 without requiring an additional agent module 28 to be stored on user system 26. Instead, user system 26 may have a user interface module 38 residing thereon. User interface module 38 may comprise any module that enables a user system, such as user system 26, to interface with network output module 22 over a network 36. According to one embodiment of the invention, network 36 may comprise an intranet, the Internet or other developed Internet-type networks. Further, user interface module 38 may comprise any standard browser module such as Microsoft Internet Explorer™, Netscape Navigator™ or other. As many user systems 26 already have a user interface module 38 stored and operating thereon, network output module 22 offers the advantage of enabling users access to server system 14 and data warehouse 12 without learning to operate a new module such as agent module 28. One embodiment of network output module 22 may comprise a web-based module called DSS Web™ offered by MicroStrategy. Accordingly, in one embodiment, a user can access server system 14 through a standard web browser, such as Microsoft Internet Explorer™, or over the Internet through network output module 22, such as DSS Web™.

In this embodiment, network output module 22 may comprise a World Wide Web tool used in conjunction with server system 14 for allowing users to deploy data warehouse/decision support applications over the Internet using industry standard World Wide Web browsers as a client. As a result, a user can access the data warehouse with little or no client maintenance, little or no software to install, and only a small amount of additional training while still maintaining all of the capabilities of agent module 23. One embodiment of network output module 22 comprises DSS Web™ offered by MicroStrategy. This embodiment provides a broad array of options for viewing information sets, such as spreadsheet grids and a wide variety of graphs. Through this module's reporting capabilities, users receive key elements of a report in easily interpretable, plain language messages. This module also allows users to "drill" dynamically to a lower level of detail to view the underlying information or to create and save new analyses. For sensitive information, this module provides security plug-ins that allow the user to extend the standard security functionality with additional user authentication routines. This module may also provide an API that allows users to customize, integrate, and imbed this functionality into other applications. For example, a data syndicator for health care information may utilize this module with a customized interface to sell access to health care information to Health Maintenance Organizations, hospitals, pharmacies, etc.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A computer program product for managing automatic generation of output from a data repository, the computer program product comprising:
   one or more tangible, non-transitory computer-readable storage devices; and
   program instructions, stored on at least one of the one or more tangible, non-transitory computer-readable storage devices that, when executed, cause a computer to:
   process at least one scheduled service, the at least one scheduled service comprising one or more reports to be run against at least one data repository;
   establish a maximum number of subscriber output devices to receive output from the at least one scheduled service;
   resolve dynamic recipient lists to generate a list of subscriber output devices to receive the output from the at least one scheduled service; and
   automatically forward the output to one or more subscriber output devices specified for the at least one scheduled service.

2. The computer program product of claim 1, wherein the program instructions, when executed, further cause a computer to:
   eliminate duplicate report requests prior to running the one or more reports against the at least one data repository.

3. The computer program product of claim 1, wherein the program instructions, when executed, further cause a computer to:
   establish a maximum number of subscribers for the at least one scheduled service.

4. A system for managing automatic generation of output from a data repository, the system comprising:
   a processor configured to execute computer program modules, the computer program modules comprising:
   a service generation module that processes at least one scheduled service, establishes a maximum number of subscriber output devices to receive output from the at least one scheduled service, and resolves dynamic recipient lists to generate a list of subscriber output devices to receive the output from the at least one scheduled service, the at least one scheduled service comprising one or more reports to be run against at least one data repository; and
   a broadcast module that automatically forwards the output to one or more subscriber output devices specified for the at least one scheduled service.

5. A computer-implemented method of managing automatic generation of output from a data repository, the method being implemented by a computer that includes a physical processor, the method comprising:
   processing at least one scheduled service, the at least one scheduled service comprising one or more reports to be run against at least one data repository;
   establishing a maximum number of subscriber output devices to receive output from the at least one scheduled service;
   resolving dynamic recipient lists to generate a list of subscriber output devices to receive the output from the at least one scheduled service; and
   automatically forwarding the output to one or more subscriber output devices specified for the at least one scheduled service.

6. A computer program product for managing automatic generation of output from a data repository, the computer program product comprising:
   one or more tangible, non-transitory computer-readable storage devices; and
   program instructions, stored on at least one of the one or more tangible, non-transitory computer-readable storage devices that, when executed, cause a computer to:
   subscribe subscribers to at least one service, the at least one service comprising one or more reports to be run against at least one data repository;
   process the at least one service according to a schedule;

establish a maximum number of subscriber output devices to receive output from the at least one service;

personalize the output from the at least one service for subscribers; and forward the output to one or more subscriber output devices of subscribers.

7. The computer program product of claim 6, wherein the program instructions, when executed, further cause a computer to:

resolve dynamic recipient lists to generate a list of subscriber output devices to receive output from the at least one service.

8. The computer program product of claim 6, wherein the program instructions, when executed, further cause a computer to:

eliminate duplicate report requests prior to running the one or more reports against the at least one data repository.

9. The computer program product of claim 6, wherein the program instructions, when executed, further cause a computer to:

establish a maximum number of subscribers for the at least one service.

10. A system for managing automatic generation of output from a data repository, comprising:

a processor configured to execute computer program modules, the computer program modules comprising:

a subscriber interface module that subscribes subscribers to at least one service, the at least one service comprising one or more reports to be run against at least one data repository;

a service generation module that processes the at least one service according to a schedule, that establishes a maximum number of subscriber output devices to receive output from the at least one service, and that personalizes the output from the at least one service for subscribers; and a broadcast module that automatically forwards the output to one or more subscriber output devices of subscribers.

11. A computer-implemented method of managing automatic generation of output from a data repository, the method being implemented by a computer that includes a physical processor, the method comprising:

subscribing subscribers to at least one service, the at least one service comprising one or more reports to be run against at least one data repository;

processing the at least one service according to a schedule;

establishing a maximum number of subscriber output devices to receive output from the at least one service;

personalizing the output from the at least one service for subscribers; and forwarding the output to one or more subscriber output devices of subscribers.

12. A computer program product for managing automatic generation of output from a data repository, the computer program comprising:

one or more tangible, non-transitory computer-readable storage devices; and program instructions, stored on at least one of the one or more tangible, non-transitory computer-readable storage devices that, when executed, cause a computer to:

create a service to be processed according to a schedule;

receive from a subscriber to the service a specified output device to which service output is to be delivered, and specified personalization criteria for personalizing the service output;

create a data record for the subscriber, the subscriber data record including an address associated with the specified output device, and one or more personalization filters based on the specified personalization criteria;

process the service according to the schedule to generate the service output, wherein the service comprises one or more reports to be run against at least one data repository;

establish a maximum number of subscriber output devices to receive the service output from the service;

personalize the service output for the subscriber according to the one or more personalization filters included in the subscriber data record; and forward the personalized service output to the specified output device of the subscriber.

13. The computer program product of claim 12, wherein the service output comprises multiple reports and the subscriber data record includes multiple personalization filters, and wherein the program instructions, when executed, further cause a computer to:

apply a different personalization filter to each of the multiple reports.

14. The computer program product of claim 12, wherein the service output comprises multiple reports, and wherein the program instructions, when executed, further cause a computer to:

apply the same personalization filter to each of the multiple reports.

15. A system for managing automatic generation of output from a data repository, the system comprising:

a processor configured to execute computer program modules, the computer program modules comprising:

a service definition module that creates a service to be processed according to a schedule;

a service generation module that processes the service according to the schedule to generate service output and that establishes a maximum number of subscriber output devices to receive the service output from the service, wherein the service comprises one or more reports to be run against at least one data repository;

a subscription interface module that receives from a subscriber to the service a specified output device to which the service output is to be delivered, and specified personalization criteria for personalizing the service output;

a personalization module that creates a data record for the subscriber, the subscriber data record including an address associated with the specified output device, and one or more personalization filters based on the specified personalization criteria; and a broadcast module that forwards the service output to the specified output device of the subscriber, wherein the forwarded service output is personalized for the subscriber according to the one or more personalization filters included in the subscriber data record.

16. A computer-implemented method of managing automatic generation of output from a data repository, the method being implemented by a computer that includes a physical processor, the method comprising:

creating a service to be processed according to a schedule;
receiving from a subscriber to the service a specified output device to which service output is to be delivered, and specified personalization criteria for personalizing the service output;
creating a data record for the subscriber, the subscriber data record including an address associated with the specified output device, and one or more personalization filters based on the specified personalization criteria;
processing the service according to the schedule to generate the service output, wherein the service comprises one or more reports to be run against at least one data repository;
establishing a maximum number of subscriber output devices to receive the service output from the service;
personalizing the service output for the subscriber according to the one or more personalization filters included in the subscriber data record; and
forwarding the personalized service output to the specified output device of the subscriber.

* * * * *